US011643487B2

(12) United States Patent
Chiba et al.

(10) Patent No.: US 11,643,487 B2
(45) Date of Patent: May 9, 2023

(54) HEAT-RESISTANT CROSSLINKED FLUORORUBBER FORMED BODY AND METHOD OF PRODUCING THE SAME, AND HEAT-RESISTANT PRODUCT

(71) Applicant: FURUKAWA ELECTRIC CO., LTD., Tokyo (JP)

(72) Inventors: Hiroki Chiba, Tokyo (JP); Masaki Nishiguchi, Tokyo (JP); Arifumi Matsumura, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 345 days.

(21) Appl. No.: 16/886,214

(22) Filed: May 28, 2020

(65) Prior Publication Data

US 2020/0291151 A1 Sep. 17, 2020

Related U.S. Application Data

(63) Continuation of application No. PCT/JP2019/027164, filed on Jul. 9, 2019.

(30) Foreign Application Priority Data

Jul. 10, 2018 (JP) .............................. JP2018-131049

(51) Int. Cl.
| | |
|---|---|
| C08J 3/22 | (2006.01) |
| C08J 3/24 | (2006.01) |
| C08K 3/013 | (2018.01) |
| C08L 27/18 | (2006.01) |
| C08L 27/12 | (2006.01) |
| C08K 5/5425 | (2006.01) |
| C08F 214/26 | (2006.01) |
| C08F 4/32 | (2006.01) |
| C08F 210/02 | (2006.01) |
| C08F 210/06 | (2006.01) |
| C08F 220/06 | (2006.01) |
| C08K 3/34 | (2006.01) |
| C08K 3/36 | (2006.01) |
| C08K 5/5415 | (2006.01) |
| C08K 3/22 | (2006.01) |
| C08K 3/26 | (2006.01) |

(52) U.S. Cl.
CPC ............ *C08F 214/265* (2013.01); *C08F 4/32* (2013.01); *C08F 210/02* (2013.01); *C08F 210/06* (2013.01); *C08F 220/06* (2013.01); C08K 3/346 (2013.01); C08K 3/36 (2013.01); C08K 5/5415 (2013.01); C08K 2003/2296 (2013.01); C08K 2003/265 (2013.01)

(58) Field of Classification Search
CPC .......... C08J 3/24; C08L 51/003; C08L 51/04; C08L 27/12; C08L 27/18; C08F 210/02; C08F 259/08; C08F 214/182; C08F 214/265

See application file for complete search history.

(56) References Cited

U.S. PATENT DOCUMENTS

| | | | |
|---|---|---|---|
| 2011/0184126 | A1 | 7/2011 | Takemura et al. |
| 2012/0108753 | A1 | 5/2012 | Takemura et al. |
| 2018/0346664 | A1 | 12/2018 | Nishiguchi et al. |
| 2018/0346702 | A1 | 12/2018 | Nishiguchi et al. |

FOREIGN PATENT DOCUMENTS

| | | |
|---|---|---|
| JP | 1-190739 A | 7/1989 |
| JP | 2-209942 A | 8/1990 |
| JP | 6-306245 A | 11/1994 |
| JP | 2011-12212 A | 1/2011 |
| JP | 2013-57089 A | 3/2013 |
| JP | 2015-86385 A | 5/2015 |
| JP | 2016-37515 A | 3/2016 |
| JP | 2017-88815 A | 5/2017 |
| JP | 2017-141384 A | 8/2017 |
| JP | 2017-179236 A | 10/2017 |
| WO | WO 2010/029899 A1 | 3/2010 |
| WO | WO 2017/138640 A1 | 8/2017 |
| WO | WO 2017/138642 A1 | 8/2017 |
| WO | WO 2017/154585 A1 | 9/2017 |

OTHER PUBLICATIONS

Japanese Office Action, dated Mar. 23, 2021, for corresponding Japanese Application No. 2018-131049, with an English machine translation.
Japanese Office Action for corresponding Japanese Application No. 2018-131049, dated Sep. 1, 2020, with English translation.
International Search Report for PCT/JP2019/027164 dated Oct. 8, 2019.
Written Opinion of the International Searching Authority for PCT/JP2019/027164 (PCT/ISA/237) dated Oct. 8, 2019.

*Primary Examiner* — Irina S Zemel
*Assistant Examiner* — Jeffrey S Lenihan
(74) *Attorney, Agent, or Firm* — Birch, Stewart, Kolasch & Birch, LLP

(57) ABSTRACT

A method of producing a heat-resistant crosslinked fluororubber formed body, including a step (1) of melt-mixing, with respect to 100 mass parts of base rubber containing 40 to 98 mass % of fluororubber and 2 to 40 mass % of ethylene/tetrafluoroethylene copolymer resin, 0.003 to 0.5 mass parts of organic peroxide, 0.5 to 400 mass parts of inorganic filler, 2 to 15 mass parts of a specific silane coupling agent, and silanol condensation catalyst, and including a step (a) of melt-mixing a part of the base rubber, the organic peroxide, the inorganic filler and the silane coupling agent at a temperature equal to or higher than a decomposition temperature of said organic peroxide, and a step (b) of melt-mixing a remainder of the base rubber, and the silanol condensation catalyst, and the fluororubber and the ethylene/tetrafluoroethylene copolymer resin are melt-mixed in any of the steps (a) and (b).

12 Claims, No Drawings

HEAT-RESISTANT CROSSLINKED FLUORORUBBER FORMED BODY AND METHOD OF PRODUCING THE SAME, AND HEAT-RESISTANT PRODUCT

CROSS-REFERENCE TO RELATED APPLICATIONS

This application is a Continuation of PCT International Application No. PCT/JP2019/027164 filed on Jul. 9, 2019, which claims priority under 35 U.S.C. § 119 (a) to Japanese Patent Application No. 2018-131049 filed in Japan on Jul. 10, 2018. Each of the above applications is hereby expressly incorporated by reference, in its entirety, into the present application.

TECHNICAL FIELD

The present invention relates to a heat-resistant crosslinked fluororubber formed body and a method of producing the same, and a heat-resistant product.

BACKGROUND ART

Wiring materials, such as insulated wires, cables, cords, optical fiber core wires or optical fiber cords (optical fiber cables), each of which can be used in an electrical- or electronic-equipment field, and an industrial field, are required to have various characteristics, such as flame retardancy, heat resistance and mechanical characteristics (for example, tensile property and abrasion resistance (or wear resistance)).

Further, by extended periods of use, the temperature of these wiring materials is sometimes raised to the range of 80 to 105° C., further to about 125° C., and even to 150° C. or more depending on the intended use or the like. Thus, heat resistance for the extended periods of use is also sometimes required. In this case, crosslinked materials of rubbers or resins are to be used as the wiring materials. As methods of crosslinking rubbers or resins, electron beam crosslinking methods or chemical crosslinking methods are generally utilized.

Conventionally, as methods for crosslinking polyolefin resins, such as polyethylene, known so far include: electron beam crosslinking methods in which the resin is crosslinked by irradiation with electron beams, and chemical crosslinking methods, such as a crosslinking method in which heat is applied after forming, to decompose organic peroxide or the like and to allow a crosslinking reaction, and a silane crosslinking method.

The silane crosslinking method means a method of obtaining a crosslinked resin, by obtaining a silane-grafted resin by allowing a grafting reaction of a silane coupling agent having an unsaturated group with a resin in the presence of organic peroxide, and then bringing the silane-grafted resin into contact with moisture in the presence of a silanol condensation catalyst.

Among the above-described crosslinking methods, in particular, the silane crosslinking method requires no special facilities in many cases, and therefore can be employed in a wide range of fields.

Incidentally, heat resistance higher than the above-described heat resistance is required for electric wire members or the like to be used in microwave ovens or gas ranges, or heat-resistant parts or the like of automobiles among the above-described wiring materials. As a resin that may meet this requirement, fluororubber that may exhibit a heat-resistant temperature of 200° C. or higher is widely used in the above-described electric wire members or the like.

In the forgoing fluororubber, crosslinked products are also desired as is the case with the above-described polyolefin resins. For example, Patent Literature 1 proposes a method of producing a fluororubber crosslinked product in which the fluororubber is crosslinked by blending a crosslinking agent for the fluororubber, such as an organic peroxide or the like in a composition that is obtained by blending and reacting, together with a diene-based rubber and a fluororubber, a crosslinking agent for the diene-based rubber, such as an organic peroxide or the like. Patent Literature 2 proposes a method of crosslinking a fluororubber composition by polyol vulcanization. Patent Literature 3 proposes a method of crosslinking a fluororubber composition by organic peroxide vulcanization.

However, it is difficult to subject a fluororubber to silane crosslinking by the silane crosslinking method. The fluororubber crosslinked product cannot be obtained only by simply applying a fluororubber in the above-described silane crosslinking method. Patent Literature 4 proposes a method of producing a heat-resistant crosslinked fluororubber formed body in which a special step is performed using both a fluororubber-containing base rubber and an inorganic filler in the silane crosslinking method.

CITATION LIST

Patent Literatures
Patent Literature 1: JP-A-01(Heisei 01)-190739 ("JP-A" means unexamined published Japanese patent application)
Patent Literature 2: JP-A-02-209942
Patent Literature 3: JP-A-06-306245
Patent Literature 4: International Publication (WO) No. 2017/138642

SUMMARY OF INVENTION

Technical Problem

It is preferred, in terms of cost or the like, that production of the wiring material and the like can be performed with general-purpose extrusion equipment (device). Further, in the case where the production is performed with the general-purpose extrusion equipment, it is preferred in terms of handling that a silane masterbatch and a catalyst masterbatch are each in the pellet form. Further, it is preferred that preparation can be performed with suppression of foaming into a desired shape without being fused together (without blocking). A production method is required, which is capable of preparing pellets that fulfill these demands.

Further, wiring materials and the like that have excellent mechanical strength (tensile strength) are required. Further, from an economical viewpoint, even if forming is performed at a high speed (long length per unit time), a formed body is required, which has excellent length formability capable of maintaining a good outer appearance.

The present invention is contemplated for providing a production method capable of preparing a silane masterbatch and a catalyst masterbatch, each of which is an intermediate product, as pellets that are difficult to fuse, with suppression of foaming (residue of bubbles), said production method being capable of producing a heat-resistant crosslinked fluororubber formed body that exhibits high mechanical strength in spite of the rubber formed body, and maintains excellent outer appearance even if forming is performed at a high speed.

Further, the present invention is contemplated for providing a heat-resistant crosslinked fluororubber formed body that is excellent in both mechanical strength and outer appearance.

Further, the present invention is contemplated for providing a heat-resistant product containing the heat-resistant crosslinked fluororubber formed body obtained according to the production method of the heat-resistant crosslinked fluororubber formed body.

Solution to Problem

The inventors of the present invention have found that when preparing the above-described silane masterbatch and the above-described catalyst masterbatch, each of which is used in a specific silane crosslinking method of preparing each a silane masterbatch containing a silane crosslinkable rubber and a catalyst masterbatch containing a silanol condensation catalyst and then mixing them, both masterbatches can be prepared as pellets that are difficult to fuse, with suppression of foaming (residue of bubbles) by using in combination a specific ratio of an ethylene/tetrafluoroethylene resin to a fluororubber. Further, the inventors of the present invention have found that when forming both masterbatches by mixting them, even if forming is performed at a high speed, the formed body obtained maintains an excellent outer appearance and exhibits a high mechanical strength in spite of the fluororubber formed body. Further, the inventors of the present invention have found that the formed body obtained has a desired heat resistance.

The inventors of the present invention have further repeated investigations based on these findings and completed the present invention.

That is, the above-described problems of the present invention are solved by the following means.

<1>

A method of producing a heat-resistant crosslinked fluororubber formed body, including the following steps (1), (2) and (3):

Step (1): a step of obtaining a reaction composition by melt-mixing, with respect to 100 parts by mass of a base rubber containing 40 to 98% by mass of a fluororubber and 2 to 40% by mass of an ethylene/tetrafluoroethylene copolymer resin, 0.003 to 0.5 parts by mass of an organic peroxide, 0.5 to 400 parts by mass of an inorganic filler, 2 to 15 parts by mass of a silane coupling agent having a grafting reaction site that is capable of being subjected to a grafting reaction with said base rubber in the presence of radicals generated from said organic peroxide, and a silanol condensation catalyst, Step (2): a step of obtaining a formed body by forming the reaction composition, and Step (3): a step of obtaining the heat-resistant crosslinked fluororubber formed body by bringing the formed body into contact with water, wherein, when performing the step (1), the step (1) includes the following step (a), step (b) and step (c), and the fluororubber and the ethylene/tetrafluoroethylene copolymer resin are melt-mixed in both of the following steps (a) and (b):

Step (a): a step of preparing a silane masterbatch containing a silane crosslinkable rubber, by melt-mixing a part of the base rubber, the organic peroxide, the inorganic filler and the silane coupling agent at a temperature equal to or higher than a decomposition temperature of said organic peroxide, and by graft-reacting the grafting reaction site and the base rubber due to radicals generated from said organic peroxide, Step (b): a step of preparing a catalyst masterbatch, by melt-mixing a remainder of the base rubber, and the silanol condensation catalyst, and Step (c): a step of obtaining the reaction composition, by melt-mixing the silane masterbatch and the catalyst masterbatch.

<2>

The method of producing a heat-resistant crosslinked fluororubber formed body described in the item <1>, wherein, in the step (1), the base rubber contains 50 to 85% by mass of the fluororubber and 13 to 35% by mass of the ethylene/tetrafluoroethylene copolymer resin, and the blending amount of the inorganic filler is 30 to 280 parts by mass.

<3>

The method of producing a heat-resistant crosslinked fluororubber formed body described in the item <1> or <2>, wherein the fluororubber is a tetrafluoroethylene/propylene copolymer rubber.

<4>

The method of producing a heat-resistant crosslinked fluororubber formed body described in any one of the items <1> to <3>, wherein a melting point of the ethylene/tetrafluoroethylene copolymer resin is 230° C. or less.

<5>

The method of producing a heat-resistant crosslinked fluororubber formed body described in any one of the items <1> to <4>, wherein the base rubber contains an ethylene/vinyl acetate copolymer resin, an ethylene/(meth)acrylic acid ester copolymer resin, an ethylene/(meth)acrylic acid copolymer resin or an acrylic rubber, or a combination thereof.

<6>

The method of producing a heat-resistant crosslinked fluororubber formed body described in any one of the items <1> to <5>, wherein the silane coupling agent is vinyl trimethoxysilane or vinyl triethoxysilane.

<7>

The method of producing a heat-resistant crosslinked fluororubber formed body described in any one of the items <1> to <6>, wherein the inorganic filler includes silica, calcium carbonate, zinc oxide, or a calcined clay, or a combination thereof.

<8>

The method of producing a heat-resistant crosslinked fluororubber formed body described in any one of the items <1> to <7>, wherein the melt-mixing in the step (a) is performed using a closed mixer.

<9>

A heat-resistant crosslinked fluororubber formed body produced by the method of producing a heat-resistant crosslinked fluororubber formed body described in any one of the items <1> to <8>.

<10>

The heat-resistant crosslinked fluororubber formed body described in the item <9>, wherein the base rubber is crosslinked with the inorganic filler through a silanol bond.

<11>

A heat-resistant product comprising the heat-resistant crosslinked fluororubber formed body described in the item <9> or <10>.

<12>

The heat-resistant product described in the item <11>, wherein the heat-resistant crosslinked fluororubber formed body is a coated layer of an electric wire or an optical fiber cable.

Note that, in this specification, numerical expressions in a style of " . . . to . . . " will be used to indicate a range including the lower and upper limits represented by the numerals given before and after "to", respectively.

Effects of the Invention

The method of producing a heat-resistant crosslinked fluororubber formed body according to the present invention can be produced with high productivity, which is capable of preparing a silane masterbatch and a catalyst masterbatch as pellets that are difficult to fuse, with suppression of foaming, and also by using both masterbatches obtained, a heat-resistant crosslinked fluororubber formed body that exhibits a high mechanical strength in spite of the rubber formed body, and that maintains an excellent outer appearance, even if forming is performed at a high speed. Further, the present invention can provide a heat-resistant product containing the above-described heat-resistant crosslinked fluororubber formed body.

Other and further features and advantages of the invention will appear more fully from the following description.

Mode for Carrying Out the Invention

First, each component to be used in the present invention will be explained.

<Base Rubber>

The base rubber to be used in the present invention contains a fluororubber and an ethylene/tetrafluoroethylene copolymer resin as essential components. When the fluororubber and the ethylene/tetrafluoroethylene copolymer resin are contained, in the production method of the present invention, any of a silane masterbatch and a catalyst masterbatch can be prepared as pellets that suppress foaming (residue of bubbles) and are difficult to fuse. Further, an excellent mechanical strength can be given to the heat-resistant crosslinked fluororubber formed body, while maintaining an outer appearance.

—Fluororubber—

The fluororubber is not particularly limited, and use can be made of ordinary fluororubber that has been used so far in a heat-resistant rubber formed body.

The fluororubber preferably has a site capable of grafting reaction with a grafting reaction site of a silane coupling agent in the presence of radicals generated from an organic peroxide, examples of said site capable of grafting reaction include an unsaturated bond site of the carbon chain, and a carbon atom having a hydrogen atom in a main chain or at the end thereof.

Further, examples of the fluororubber include a homopolymer or copolymer rubber containing a fluorine atom in the main chain or a side chain thereof. The fluororubber is obtained usually by (co)polymerizing a monomeric substance (monomer) having a fluorine atom.

Such a fluororubber is not particularly limited, and specific examples thereof include copolymer rubber between fluorine-containing monomers, such as perfluorohydrocarbon including tetrafluoroethylene and hexafluoropropylene, and partially fluorinated hydrocarbon (e.g. vinylidene fluoride), and further copolymer rubber of these perfluorohydrocarbon and/or fluorine-containing monomers and a hydrocarbon, such as ethylene and/or propylene.

Specific examples include tetrafluoroethylene/propylene copolymer rubber (FEPM), tetrafluoroethylene/fluoropropylene (for example, hexafluoropropylene) copolymer rubber, tetrafluoroethylene/perfluorovinyl ether copolymer rubber (FFKM), vinylidene fluoride rubber (FKM, for example, vinylidene fluoride/hexafluoropropylene copolymer rubber).

Further, examples thereof also include the above-described copolymer rubber of perfluorohydrocarbon and/or fluorine-containing monomers and chloroprene and/or chlorosulfonated polyethylene.

Among these fluororubbers, tetrafluoroethylene/propylene copolymer rubber and vinylidene fluoride/hexafluoropropylene copolymer rubber are preferred, and tetrafluoroethylene/propylene copolymer rubber is more preferred.

A content of the fluorine atom in the fluororubber (mass ratio of the fluorine atom with regard to the total amount of the fluororubber) is not particularly limited, and is preferably 25% by mass or more, more preferably 40% by mass or more, and further preferably 50% by mass or more. The upper limit of the fluorine content varies depending on factors, such as a molecular weight of the polymer before fluorination and the number of hydrogen atoms capable of being substituted with a fluorine atom. Therefore, the upper limit cannot be unambiguously determined, but, for example, it can be set to 75% by mass.

In the present invention, the fluorine content is determined according to a calculated value in synthesis, or a potassium carbonate pyrohydrolysis method. Specific examples of the potassium carbonate pyrohydrolysis method include the method described by Makoto Noshiro et al., NIPPON KAGAKU KAISHI, 6, 1236 (1973).

The fluororubber may be appropriately synthesized, or a commercially available product may be used.

Examples of the tetrafluoroethylene/propylene copolymer rubber include AFLAS (trade name, manufactured by AGC Ashasi Glass Co., Ltd.). Examples of the tetrafluoroethylene/perfluorovinyl ether copolymer rubber include KALREZ (trade name, manufactured by DuPont). Examples of the vinylidene fluoride rubber include VITON (trade name, manufactured by DuPont), DAI-EL (trade name, manufactured by Daikin Industries, Ltd.), DYNEON (trade name, manufactured by 3M Company), and TECNOFLON (trade name, manufactured by Solvay Specialty).

The content of the fluororubber in 100% by mass of the base rubbe is 40 to 98% by mass, preferably 50 to 85% by mass, and more preferably 60 to 80% by mass. If the content of the fluororubber is 40 to 98% by mass, the masterbatch can be prepared as pellets that are difficult to fuse, with suppression of foaming, and further mechanical strength of the resultant heat-resistant crosslinked fluororubber formed body obtained can be improved while maintaining outer appearance.

—Ethylene/Tetrafluoroethylene Copolymer Resin—

The base rubber contains ethylene/tetrafluoroethylene copolymer resin in addition to a fluororubber. By containing the ethylene/tetrafluoroethylene copolymer resin, mechanical strength and outer appearance of the heat-resistant crosslinked fluororubber formed body can be improved. Further, a silane masterbatch and a catalyst masterbatch can be prepared as pellets that are difficult to fuse, with suppression of foaming. Further, when the ethylene/tetrafluoroethylene copolymer resin is introduced into both the silane masterbatch and the catalyst masterbatch, both masterbatches increase uniform compatibility with each other at the time of forming, whereby length formability can be further improved.

The ethylene/tetrafluoroethylene copolymer resin is not particularly limited, as long as it is a resin of the copolymer of ethylene and tetrafluoroethylene.

The ethylene/tetrafluoroethylene copolymer resin has a cite (carbon atom having a hydrogen atom) capable of grafting reaction in the main chain thereof or its end.

The melting point of the ethylene/tetrafluoroethylene copolymer resin is preferably 230° C. or less, and more preferably 180° C. or less. If the melting point thereof is set to 230° C. or less, foaming of the masterbatch or the formed body at the time of kneading (or mixing) or extrusion can be further suppressed. The melting point can be measured according to ASTM D3159.

The melt flow rate (MFR: measurement temperature 297° C. and load 47 N) of the ethylene/tetrafluoroethylene copolymer resin is preferably 1 to 50 g/10 min, more preferably 3 to 40 g/10 min, and furthermore preferably 5 to 38 g/10 min. The melt flow rate can be measured according to JIS K 7210.

The content of the ethylene/tetrafluoroethylene copolymer resin in 100% by mass of the base rubber is 2 to 40% by mass, preferably 3 to 30% by mass, and more preferably 3 to 25% by mass. If the content of the ethylene/tetrafluoroethylene copolymer resin is set to 2 to 40% by mass, a masterbatch can be prepared as pellets that are difficult to fuse, with suppression of foaming in the production method. The mechanical strength of the heat-resistant crosslinked fluororubber formed body obtained can be enhanced, while maintaining outer appearance.

In the present invention, the base rubber may contain, in addition to the fluororubber and the ethylene/tetrafluoroethylene copolymer resin, other resins or rubbers, oil components (for example, mineral oils, such as paraffin oil and the like) and the like.

In this case, the content rate of each component of the base rubber is appropriately determined so that a total of said each components is 100% by mass.

As said other resins or rubbers, those having a site capable of grafting reaction in a main chain or at the end thereof are preferred. For example, ethylene/vinyl acetate (EVA) copolymer resin, ethylene/(meth)acrylic acid ester copolymer resin, and ethylene/(meth)acrylic acid copolymer resin, or acrylic rubbers, or a combination thereof are more preferred. These other resins or rubbers may be used singly alone or in combination of two or more kinds thereof.

By mixing with these other resins or rubbers, mechanical strength, abrasion resistance and formability are enhanced. As these other resins or rubbers, a resin selected from the group consisting of ethylene/vinyl acetate copolymer, ethylene/methyl acrylate copolymer, ethylene/ethyl acrylate copolymer, ethylene/butyl acrylate copolymer and an acrylic rubber is preferred, and a resin of ethylene/vinyl acetate copolymer is more preferred.

Each of these other resins or rubbers is not particularly limited and synthetic compounds or commercially available products may be appropriately used.

The content rate of these other resins or rubbers in the base rubber components is preferably 0 to 45% by mass, more preferably 0 to 35% by mass, and furthermore preferably 10 to 30% by mass. If the above-described content is within the above-described ranges, these other resins or rubbers may impart more excellent abrasion resistance and lengthy formability.

<Organic Peroxide>

The organic peroxide generates radicals at least by thermal decomposition, and functions as a catalyst, to cause a grafting reaction by a radical reaction of the base rubber with a silane coupling agent (a covalent bond-forming reaction between a grafting reaction site of the silane coupling agent and a site capable of the grafting reaction of the base rubber, and this is also referred to as a (radical) addition reaction).

As the organic peroxide, those that have the above-described functions and are used for a radical polymerization or a conventional silane crosslinking method can be used without any particular limitation. For example, benzoyl peroxide, dicumyl peroxide (DCP), 2,5-dimethyl-2,5-di-(tert-butylperoxy)hexane or 2,5-dimethyl-2,5-di-(tert-butylperoxy)hexine-3 is preferred.

The decomposition temperature of the organic peroxide is preferably 80 to 195° C., and particularly preferably 125 to 180° C. For the present invention, the decomposition temperature of the organic peroxide means the temperature, at which, when an organic peroxide having a single composition is heated, the organic peroxide itself causes a decomposition reaction and decomposes into two or more kinds of compounds at a certain temperature or temperature range. In specific, the decomposition temperature is a temperature at which heat absorption or heat generation starts, when the organic peroxide is heated from a room temperature in a heating speed of 5° C./min under a nitrogen gas atmosphere, by a thermal analysis, such as a DSC method.

The organic peroxide may be used singly alone, or in combination of two or more kinds thereof.

<Inorganic Filler>

In the present invention, the inorganic filler is not particularly limited. However, preferred are those having, on their surfaces, a site that can be chemically bonded by a hydrogen bond or a covalent bond and the like, or an intermolecular bond with a reaction site (hydrolysable silyl group), such as a silanol group of the silane coupling agent. For the inorganic filler, examples of the site that can be chemically bonded with the reaction site of the silane coupling agent may include an OH group (OH group of hydroxy group, of water molecule in hydrous substance or crystallized water, or of carboxyl group), amino group, a SH group, and the like.

As such an inorganic filler, though not limited to these, use can be made of metal hydrate, such as a metal compound having a hydroxy group or crystallized water, for example, aluminum hydroxide, magnesium hydroxide, calcium carbonate, magnesium carbonate, calcium silicate, magnesium silicate, calcium oxide, magnesium oxide, aluminum oxide, aluminum nitride, aluminum borate whisker, hydrated aluminum silicate, hydrated magnesium silicate, basic magnesium carbonate, hydrotalcite, and talc. Further, use can be made of boron nitride, silica (crystalline silica, amorphous silica, and the like), carbon, clay (calcined clay), zinc oxide, tin oxide, titanium oxide, molybdenum oxide, antimony trioxide, a silicone compound, quartz, zinc borate, white carbon, zinc borate, zinc hydroxystannate, or zinc stannate.

As the inorganic filler, use can be made of a surface-treated inorganic filler, surface-treated with a silane coupling agent or the like. Specific examples of silane coupling agent-surface-treated inorganic filler include KISUMA 5L and KISUMA 5P (both trade names, magnesium hydroxide, manufactured by Kyowa Chemical Industry Co., Ltd.) or the like. The amount of surface treatment of the inorganic filler with a silane coupling agent is not particularly limited, but is 3 mass % or less, for example.

Among these inorganic fillers, preferred is silica, calcium carbonate, zinc oxide, a calcined clay or talc, or a combination thereof. Silica, calcium carbonate, zinc oxide, a calcined clay, or a combination thereof is more preferred. A combination including silica or/and zinc oxide is furthermore preferred.

The inorganic filler may be used singly alone, or in combination of two or more kinds thereof.

When the inorganic fillers is in a powder form, the inorganic filler has an average particle diameter of preferably 0.2 to 10 μm, more preferably 0.3 to 8 μm, further preferably 0.4 to 5 μm, and particularly preferably 0.4 to 3 μm. If the average particle diameter is within the above-described range, a silane coupling agent holding effect is high, to provide the product having excellent heat resistance. In addition, the inorganic filler is hard to cause secondary aggregation in mixing with the silane coupling agent, to provide the product having excellent outer appearance. The average particle diameter is obtained by dispersing the inorganic filler in alcohol or water, and then measuring using an optical particle diameter measuring device, such as a laser diffraction/scattering particle diameter distribution measuring device.

<Silane Coupling Agent>

The silane coupling agent is not particularly limited, as long as it has a site (a group or an atom, this site is also referred to as a grafting reaction site) capable of causing a grafting reaction with a site of the base rubber that is capable of causing a grafting reaction in the presence of radicals generated from the decomposition of said organic peroxide, and further has a hydrolysable silyl group capable of causing silanol condensation. Examples of these silane coupling agents include silane coupling agents which have been used in the conventional silane crosslinking method.

Examples of these silane coupling agents include silane coupling agents having an unsaturated group. Specific examples thereof include: vinyl silanes, such as vinyl trimethoxy silane, vinyl triethoxy silane, vinyl tributoxy silane, vinyl dimethoxyethoxy silane, vinyl dimethoxybutoxy silane, vinyl diethoxybutoxy silane, allyl trimethoxyethoxy silane, allyl triethoxy silane and vinyl triacetoxy silane; and (meth)acryloxy silane. Of the above, vinyl trimethoxy silane or vinyl triethoxy silane is particularly preferred.

The silane coupling agent may be used singly alone, or in combination of 2 or more kinds thereof.

The silane coupling agent may be used directly (without any change of the form), or in the form of being diluted with a solvent.

<Silanol Condensation Catalyst>

The silanol condensation catalyst is capable of causing a condensation reaction (acceleration), in the presence of moisture, of a hydrolysable silyl group of the silane coupling agent grafted to the base rubber. Due to the function of this silanol condensation catalyst, base rubbers are mutually crosslinked through the silane coupling agent. As a result, obtained is a heat-resistant crosslinked fluororubber formed body having excellent heat resistance.

The forgoing silanol condensation catalyst is not particularly limited. Examples thereof include organotin compounds, metal soaps, and platinum compounds. As the organotin compounds, examples thereof include organotin compounds, such as dibutyl tin dilaurate, dioctyl tin dilaurate, dibutyl tin dioctylate, and dibutyl tin diacetate.

The silanol condensation catalyst may be used singly alone, or in combination of 2 or more kinds thereof.

<Carrier Rubber>

The silanol condensation catalyst may be used, by being mixed in the remainder (also referred to as a carrier rubber) of the base rubber. As the carrier rubber, a fluororubber and an ethylene/tetrafluoroethylene copolymer resin are used in combination. By using the fluororubber and the ethylene/tetrafluoroethylene copolymer resin in combination, a catalyst MB (masterbatch) can be prepared as pellets that are difficult to fuse, with suppression of foaming, and also compatibility of the catalyst MB obtained and a silane MB is enhanced, whereby a formed body that is excellent in both outer appearance and tensile strength can be obtained.

In the carrier rubber, use may be made of base rubber components other than the above 2 kinds of the materials. Further, any other base rubber components may be contained therein.

<Additive>

To the heat-resistant crosslinked fluororubber formed body and the like, at least one of various additives, which are usually used for electric wires, electric cables, electric cords, sheets, foams, tubes, and pipes, may be properly used in the range that does not adversely affect the effects exhibited by the present invention. Examples of these additives include a crosslinking assistant (a crosslinking aid or a crosslinking auxiliary), an antioxidant, a lubricant, a metal inactivator, a filling agent (including a flame retardant and a flame retardant aid), and the like.

The antioxidant is not particularly limited, but, for example, an amine-based antioxidant, a phenol-based antioxidant, sulfur-based antioxidant, and the like, can be used. Examples of the amine-based antioxidant include 4,4'-dioctyl-diphenylamine, N,N'-diphenyl-p-phenylenediamine, 2,2,4-trimethyl-1,2-dihydroquinoline polymer; and the like. Examples of the phenol-based antioxidant include pentaerythritol-tetrakis(3-(3,5-di-tert-butyl-4-hydroxyphenyl)propionate), octadecyl-3-(3,5-di-tert-butyl-4-hydroxyphenyl)propionate, 1,3,5-trimethyl-2,4,6-tris(3,5-di-tert-butyl-4-hydroxybenzyl)benzene; and the like. Examples of the sulfur-based antioxidant include bis(2-methyl-4-(3-n-alkyl-thiopropionyloxy)-5-tert-butylphenyl)sulfide, 2-mercapto-benzimidazole and zinc salts thereof, and pentaerythritol-tetrakis(3-lauryl-thiopropionate). The antioxidant is preferably included in a content of 0.1 to 15.0 parts by mass, and more preferably included in a content of 0.1 to 10 parts by mass, with respect to 100 parts by mass of the base rubber.

<Method of Producing a Heat-Resistant Crosslinked Fluororubber Formed Body>

Next, the production method of the present invention is specifically described.

The method of producing a heat-resistant crosslinked fluororubber formed body according to the present invention includes the following steps (1), (2) and (3).

<Step (1)>

A step of obtaining a reaction composition, by melt-mixing, with respect to 100 parts by mass of a base rubber containing 40 to 98% by mass of a fluororubber and 2 to 40% by mass of an ethylene/tetrafluoroethylene copolymer resin, 0.003 to 0.5 parts by mass of an organic peroxide, 0.5 to 400 parts by mass of an inorganic filler, 2 to 15 parts by mass of a silane coupling agent having a grafting reaction site that is capable of a grafting reaction with said base rubber in the presence of radicals generated from said organic peroxide, and a silanol condensation catalyst.

<Step (2)>
A step of obtaining a formed body by forming the reaction composition.
<Step (3)>
A step of obtaining the heat-resistant crosslinked fluororubber formed body by bringing the formed body into contact with water.

The step (1) includes the following step (a), step (b) and step (c).
<Step (a)>
A step of preparing a silane masterbatch containing a silane crosslinkable rubber, by melt-mixing a part of the base rubber, the organic peroxide, the inorganic filler and the silane coupling agent at a temperature equal to or higher than a decomposition temperature of said organic peroxide, and by graft-reacting the grafting reaction site and the base rubber due to radicals generated from said organic peroxide.
<Step (b)>
A step of preparing a catalyst masterbatch, by melt-mixing a remainder of the base rubber, and the silanol condensation catalyst.
<Step (c)>
A step of obtaining the reaction composition, by melt-mixing the silane masterbatch and the catalyst masterbatch.

In the method of producing a heat-resistant crosslinked fluororubber formed body according to the present invention, the fluororubber and the ethylene/tetrafluoroethylene copolymer resin are used in combination (melt-mixed) in both steps of the step (a) and the step (b). That is, the fluororubber and the ethylene/tetrafluoroethylene copolymer resin are blended as a component of the silane masterbatch and a base rubber component of the catalyst masterbatch. If performed in this way, the silane masterbatch and the catalyst masterbatch can be prepared as pellets that are difficult to fuse, with suppression of foaming, further a remainder of bubbles generated in the preparation (melt-kneading). Further, compatibility of the silane masterbatch and the catalyst masterbatch enhances, whereby a highly mixed reaction composition can be obtained in the step (c). As a result, a formed body exhibiting excellent mechanical strength can be also produced while maintaining outer appearance even upon the high-speed forming.

In the production method of the present invention, the term "base rubber" is a rubber for forming a heat-resistant crosslinked fluororubber formed body. Accordingly, in the production method of the present invention, 100 parts by mass of the base rubber is contained in the reaction composition obtained in the step (1). In a case where 100 parts by mass of the base rubber that is a blending amount in the step (1) is a total amount of the base rubber to be melt-mixed in the step (a) and the step (b).

In the step (1), a blending amount of the organic peroxide is 0.003 to 0.5 part by mass, preferably 0.005 to 0.5 part by mass, more preferably 0.005 to 0.2 parts by mass, with respect to 100 parts by mass of the base rubber. By setting the blending amount of the organic peroxide to this range, the masterbatch can be prepared as pellets that are difficult to fuse, with suppression of foaming. Further, a grafting reaction can be performed within an appropriate range, whereby a heat-resistant crosslinked fluororubber having excellent mechanical strength can be obtained.

In the step (1), a blending amount of the inorganic filler is 0.5 to 400 parts by mass, preferably 1 to 400 parts by mass, and more preferably 30 to 280 parts by mass, with respect to 100 parts by mass of the base rubber. If the blending amount of the inorganic filler is less than 0.5 parts by mass, a grafting reaction of the silane coupling agent becomes ununiform, so that excellent mechanical strength may not be given to the heat-resistant crosslinked fluororubber formed body. Further, sometimes, excellent heat resistance may not be given thereto. Further, a grafting reaction of the silane coupling agent becomes ununiform, so that outer appearance of the heat-resistant crosslinked fluororubber formed body may be lowered. On the other hand, if the blending amount is over 400 parts by mass, the load in the time of forming or kneading becomes so large that forming by length formation may become difficult. Further, mechanical strength or outer appearance may lower. Sometimes, heat resistance may lower.

In the step (1), the blending amount of the silane coupling agent is 2 to 15 parts by mass, with respect to 100 parts by mass of the base rubber. If the blending amount of the silane coupling agent is less than 2 parts by mass, a crosslinking reaction does not proceed sufficiently, so that excellent mechanical strength and heat resistance may not be exhibited. On the other hand, if the blending amount is over 15.0 parts by mass, the silane coupling agent is unable to be farther adsorbed on the inorganic filler surfaces, and the silane coupling agent is volatilized in kneading, and such a case is not economical. In addition, the silane coupling agent that is not adsorbed causes condensation, and a crosslinked gel or aggregated substance or a burn is generated in the formed body, and the outer appearance is liable to be lowered. In particular, in the high-speed forming in which outer appearance tends to deteriorate, the outer appearance lowers.

From the above-described viewpoints, the blending amount of the silane coupling agent is preferably 3 to 12 parts by mass, and more preferably 4 to 12 parts by mass, with respect to 100 parts by mass of the base rubber.

In the step (1), the blending amount of the silanol condensation catalyst is not particularly limited, and is preferably 0.0001 to 0.5 part by mass, and more preferably 0.001 to 0.2 part by mass, with respect to 100 parts by mass of the base rubber. If the blending amount of the silanol condensation catalyst is within the above-described range, a crosslinking reaction due to a condensation reaction of the silane coupling agent is apt to proceed almost uniformly, so that excellent outer appearance and physical property and also improved productivity are achieved, while maintaining heat resistance of the heat-resistant crosslinked fluororubber formed body.

In the above-described step (1), from viewpoints of combining outer appearance and flexibility, the base rubber contains 40 to 98% by mass of the fluororubber and 2 to 40% by mass of the ethylene/tetrafluoroethylene copolymer resin. The base rubber preferably contains 50 to 85% by mass of the fluororubber and 13 to 35% by mass of the ethylene/tetrafluoroethylene copolymer resin. Further, the blending amount of the inorganic filler is preferably 1 to 400 parts by mass, and more preferably 3 to 280 parts by mass.

In the above-described step (1), from viewpoints of combining outer appearance and mechanical strength, the base rubber preferably contains 50 to 85% by mass of the fluororubber and 13 to 35% by mass of the ethylene/tetrafluoroethylene copolymer resin. It is preferable that the base rubber contains 50 to 85% by mass of the fluororubber and 13 to 35% by mass of the ethylene/tetrafluoroethylene copolymer resin, and further it is more preferable that the blending amount of the inorganic filler is 30 to 280 parts by mass.

In the combination of the above-described blending amounts, a content of each of the fluororubber, the ethylene/tetrafluoroethylene copolymer resin and the inorganic filler is each independently capable of being set to a preferable range and the like, described above or described below.

In the step (1), a part of the base rubber is blended in the step (a) and a remainder of the base rubber is blended in the step (b).

In the step (a), of the blending amount of the base rubber in the step (1), preferably from 70 to 99 parts by mass and more preferably from 80 to 95 parts by mass are blended. In the step (b), of the blending amount of the base rubber (carry rubber) in the step (1), preferably from 1 to 30 parts by mass and more preferably from 5 to 20 parts by mass are blended.

The base rubber components in the step (1) are blended preferably in the following manner in the step (a) and step (b).

Herein, the content rate of the fluororubber in 100% by mass of the base rubber in the step (1) is designated as X, and the content rate of the ethylene/tetrafluoroethylene copolymer resin is designated as Y. X and Y satisfy the following relationship: $X+Y \leq 100\%$ by mass. Further, of the content rate X of the fluororubber in the step (1), when the content rate of the fluororubber in the step (a) is designated as Xa and when the content rate of the fluororubber in the step (b) is designated as Xb, X, Xa and Xb satisfy the following relationship: $X=Xa+Xb$. Of the content rate Y of the ethylene/tetrafluoroethylene copolymer resin in the step (1), when the content rate of the ethylene/tetrafluoroethylene copolymer resin in the step (a) is designated as Ya and when the content rate of the ethylene/tetrafluoroethylene copolymer resin in the step (b) is designated as Yb, Y, Ya and Yb satisfy the following relationship: $Y=Ya+Yb$.

The content rate Xa of the fluororubber in the step (a) is preferably 30 to 80% by mass and more preferably 35 to 60% by mass. Further, the content rate Ya of the ethylene/tetrafluoroethylene copolymer resin in the step (a) is preferably 1 to 30% by mass and more preferably 3 to 25% by mass.

In the step (a), a ratio (Xa/Ya) of the content rate Xa of the fluororubber to the content rate Ya of the ethylene/tetrafluoroethylene copolymer resin in the base rubber is preferably 1 to 80 and more preferably 1.4 to 20.

Further, in the step (a), the base rubber preferably contains, as the above-described other resin or rubber, a resin or rubber having a site capable of grafting reaction in a main chain or its end. From the viewpoints of combining heat resistance and mechanical strength, the content rate Z mentioned above is preferably 1 to 40% by mass and more preferably 5 to 30% by mass, with respect to 100% by mass of the base rubber. In this case, the amount of each component is adjusted so that the following relationship is satisfied: $X+Y+Z \leq 100\%$ by mass.

The content rate Xb of the fluororubber in the step (b) is preferably 1 to 29% by mass and more preferably 5 to 20% by mass. Further, the content rate Yb of the ethylene/tetrafluoroethylene copolymer resin in the step (b) is preferably 1 to 29% by mass and more preferably 10 to 25% by mass.

Further in the step (b), the ratio (Xb/Yb) of the content rate Xb of the fluororubber to the content rate Yb of the ethylene/tetrafluoroethylene copolymer resin in the carrier rubber is preferably 0.03 to 29 and more preferably 0.2 to 2.

The silane masterbatch can be prepared by the step (a) of casting: a part of the base rubber containing the fluororubber and the ethylene/tetrafluoroethylene copolymer resin; the organic peroxide; the inorganic filler; and the silane coupling agent in each above blending amount into a mixing machine, and then melt-kneading the resultant mixture while heating at a temperature equal to or higher than a decomposition temperature of the organic peroxide, thereby to cause the above-described grafting reaction.

The mixing order in the step (a) is not particularly limited and the above-described components may be mixed in any order.

In the present invention, the inorganic filler is preferably mixed in advance with the silane coupling agent to use. That is, in the present invention, each component described above is preferably (melt-)mixed through the following steps (a-1) and (a-2).

Step (a-1): a step of mixing at least the inorganic filler and the silane coupling agent, to prepare a mixture.

Step (a-2): a step of preparing a silane masterbatch containing a silane crosslinkable rubber by melt-mixing the mixture and a part of the base rubber containing the fluororubber and the ethylene/tetrafluoroethylene copolymer resin at a temperature equal to or higher than a decomposition temperature of the organic peroxide, and then graft-reacting a grafting reaction site and the base rubber by radicals generated from said organic peroxide.

In the step (a-2), a part of the base rubber is blended and a remainder of the base rubber is blended in the step (b).

In the case where a part of the base rubber is blended in the step (a-2), 100 parts by mass that is a blending amount of the base rubber in the step (a) and the step (b) is a total amount of the base rubber being mixed in the step (a-2) and the step (b).

In the present invention, as described above, the silane coupling agent is preferably pre-mixed or the like with the inorganic filler (step (a-1)).

The method of mixing the inorganic filler and the silane coupling agent is not particularly limited, and mixing methods can be mentioned, such as wet treatment and dry treatment. In the mixing method, any of methods and conditions may be appropriately set. In the present invention, however, preferred is a dry treatment in which a silane coupling agent is added and mixed under the heated or unheated condition in an inorganic filler, preferably in a dried inorganic filler.

The pre-mixed silane coupling agent exists in such a manner of surrounding the surface of the inorganic filler, and a part or a whole thereof is adsorbed or bonded on the inorganic filler. In this manner, it becomes possible to suppress the volatilization of the silane coupling agent in the subsequent melt-mixing. Further, it is also possible to prevent the condensation among the silane coupling agents that are neither adsorbed nor bonded on the inorganic fillers, which makes melt-blending difficult. Furthermore, a desired shape can be obtained upon extrusion forming.

Examples of the forgoing mixing method include preferably a method of mixing (dispersing) the inorganic filler and the silane coupling agent at a temperature lower than a decomposition temperature of the organic peroxide, preferably at room temperature (25° C.), for about several minutes to about several hours in a dry system or a wet system.

In the mixing at a temperature lower than a decomposition temperature of the organic peroxide, a base rubber may be present, as long as the above-described temperature lower than a decomposition temperature of the organic peroxide is maintained. In this case, it is preferable that after mixing the metal oxide and the silane coupling agent together with the base rubber at the above-described temperature (the step (a-1)), the resultant mixture is melt-mixed. That is, it is preferable that while suppressing a radical grafting reaction between the base rubber and the silane coupling agent, these mixtures (for example, a dry-blended product) are prepared, and then the mixture obtained is further melt-mixed, to thereby cause the above-described grafting reaction.

A method of mixing the organic peroxide is not particularly limited, and the organic peroxide only needs to exist in melt-mixing the above-described mixture and the base rubber. The organic peroxide may be mixed, for example, simultaneously with the inorganic filler and the like, or may be mixed in any of stages of mixing the inorganic filer and the silane coupling agent, or may be mixed with the mixture of the inorganic filler and the silane coupling agent. For example, the organic peroxide may be mixed with the inorganic filler after the organic peroxide is mixed with the silane coupling agent, or may be mixed with the inorganic filler separately from the silane coupling agent. Only the silane coupling agent may be mixed with the inorganic filler, and then the organic peroxide may be mixed, depending on production conditions.

In addition, the organic peroxide may be a material mixed with any other component or a single body.

In the production method of the present invention, the obtained mixture, a part of the base rubber, and the remaining component(s) that is not mixed in the step (a-1) are subsequently melt-kneaded in the presence of the organic peroxide while the mixture is heated to the temperature equal to or higher than the decomposition temperature of the organic peroxide (step (a-2)). This causes the above-described grafting reaction of the silane coupling agent to the base rubber, whereby the silane masterbatch containing the above-described silane crosslinkable rubber can be prepared.

In the step (a-2), the temperature at which the above-described components are melt-mixed (also referred to as melt-kneaded or kneaded) is equal to or higher than the decomposition temperature of the organic peroxide, preferably a temperature of the decomposition temperature of the organic peroxide plus (25 to 110)° C. This decomposition temperature is preferably set after the base rubber components are melted. If the above-described mixing temperature is applied, the above-described components are melted, and the organic peroxide is decomposed and acts thereon, and a required silane grafting reaction sufficiently progresses in the step (a-2). Other conditions, for example, a mixing time can be appropriately set.

A mixing method is not particularly limited, as long as the mixing method is a method ordinarily applied for rubber, plastic or the like. A mixing device may be appropriately selected depending on, for example, the blending amount of the inorganic filler. As a kneading device, a single-screw extruder, a twin-screw extruder, a roll, a Banbury mixer, or various kneaders may be used. From the standpoint of the dispersibility of the base rubber components and the stability of the crosslinking reaction, an enclosed mixer, such as Banbury mixer or various kneaders, is preferable.

In addition, when the inorganic filler is blended exceeding 100 parts by mass with respect to 100 parts by mass of the base rubber, the kneading is preferably performed with an enclosed mixer, such as a continuous kneader, a pressured kneader, or a Banbury mixer.

A mixing method of the base rubber containing the fluororubber and the ethylene/tetrafluoroethylene copolymer resin is not particularly limited. For example, a base rubber prepared by pre-mixing may be used, or alternatively each component, for example, the fluororubber, the ethylene/tetrafluoroethylene copolymer resin, the other resin or rubber components, etc, the oil components, or the plasticizers, may be each separately mixed.

The mixing method having the step (a-1) and the step (a-2) includes preferably a method in which, as mentioned above, after mixing (dispersing) the inorganic filler and the silane coupling agent at a temperature lower than a decomposition temperature of the organic peroxide in a dry system or a wet system (the step (a-1), the mixture obtained and the base rubber are melt-mixed in the presence of the organic peroxide (step (a-2)).

By the melt-mixing in the step (a) (preferably the step (a-2)), a grafting reaction site of the silane coupling agent and a site capable of the grafting reaction of the base rubber are subjected to grafting-reaction by radicals generated from the organic peroxide. As a result, a silane crosslinkable rubber or a silane crosslinkable resin (these are collectively referred to as a silane crosslinkable rubber or a silane graft polymer), in which the silane coupling agent is bonded to a rubber component or a resin component through a covalent bond, is synthesized, so that a silane masterbatch containing the forgoing silane crosslinkable rubber is prepared. In this grafting reaction, normally, one molecular silane coupling agent is added to one site capable of the grafting reaction. However, the present invention is not limited to this relationship.

The above-described melt-mixing is preferably performed by a mixer-type kneading machine, such as Banbury mixer or any of kneaders. This allows prevention of an excessive crosslinking reaction between base rubber components, which results in excellent outer appearance.

In the present invention, when each component described above is melt-mixed at one time (step (1)), melt-mixing conditions are not particularly limited, and the conditions in the step (a-2) can be adopted.

In this case, a part or all of the silane coupling agent is adsorbed or bonded to the inorganic filler in melt-mixing.

In the step (a), especially in the step (a-2), the above-mentioned each component is preferably kneaded without substantially mixing the silanol condensation catalyst. Thus, condensation reaction of the silane coupling agents can be suppressed, melt-mixing is easily conducted, and a desired shape can be obtained at the time of extrusion forming. Here, the term "without substantially mixing" does not meant to exclude the situation wherein the silanol condensation catalyst unavoidably exists, and means that the silanol condensation catalyst may exist at a degree at which the above-mentioned problem due to silanol condensation of the silane coupling agent is not caused. For example, in the step (a-2), the silanol condensation catalyst may exist when the content is 0.01 part by mass or less, with respect to 100 parts by mass of the base rubber.

In the step (1), in addition to the above-described components, it is also preferable for the base rubber to have, as a base rubber component, the above-described other resins or rubbers each of which has a site capable of a grafting reaction in the main chain or at the end thereof. In this step, the blending amount of the other resins or rubbers and the above-described any of additives that can be used is appropriately set to the extent that it does not damage the purpose of the present invention.

In the step (1), the above-described any of additives, particularly, the antioxidant or the metal inactivator may be mixed in any step or to any component, but may be mixed in the carrier rubber in view of not inhibiting the grafting reaction of the silane coupling agent mixed in the inorganic filler to the base rubber.

In this way, in performance of the step (a) {preferably the step (a) consisting of the step (a-1) and the step (a-2)}, the silane coupling agent and the base rubber are subjected to a grafting reaction, to thereby prepare the silane masterbatch (also referred to as the silane MB). The silane MB obtained in this way is used for production of a masterbatch mixture. Further, as described below, the silane MB is used for production of a reaction composition (silane crosslinkable rubber composition) being prepared in the step (1), preferably together with a catalyst masterbatch described below. This silane MB contains a silane crosslinkable rubber having a silane coupling agent grafted to the base rubber, to the extent that forming can be performed by the step (b) described below.

In the production method of the present invention, next, a step (b) is performed by melt-mixing a remainder of the base rubber (also referred to as a carrier rubber) with a silanol condensation catalyst, thereby to prepare a catalyst masterbatch (also referred to as a catalyst MB). In the step (b), as the remainder of the base rubber, at least the fluororubber and the ethylene/tetrafluoroethylene copolymer resin are used.

A mixing rate of the carrier rubber and the silanol condensation catalyst is not particularly limited. However, the mixing rate is preferably set so as to satisfy the above-described blending amount in the step (1).

The mixing only needs to be performed by a method having a capability of uniformly performing mixing, and specific examples thereof include mixing (melt-mixing) performed under melting of the base rubber. The melt-mixing can be performed in a manner similar to the melt-mixing in the above-described step (a-2). For example, the mixing temperature is preferably from 80 to 250° C., and more preferably from 100 to 240° C. Other conditions, such as a mixing time, can be appropriately set.

The catalyst MB to be thus prepared is a mixture of the silanol condensation catalyst and the carrier rubber.

In the production method of the present invention, next, a step (c) of obtaining the reaction composition by melt-mixing the silane MB and the catalyst MB is performed. This reaction composition is a composition containing the silane crosslinkable rubber synthesized in the above-described step (a-2).

As the mixing method, any mixing method may be employed as long as the uniform reaction composition mixture can be obtained as mentioned above. For example, the mixing is basically similar to the melt-mixing in the step (a-2). There are resin components whose melting points cannot be measured by DSC or the like, elastomers for example, but kneading is performed at a temperature at which at least the base rubber melts. The melting temperature is appropriately selected according to the melting temperature of the base rubber or the carrier rubber, and, for example, it is preferably from 80 to 250° C., and more preferably from 100 to 240° C. Other conditions, for example, a mixing (kneading) time can be appropriately set.

In the step (c), in order to avoid the silanol condensation reaction, it is preferable that the silane MB and the silanol condensation catalyst are not kept in a high temperature state for a long period of time in the state of being mixed.

In the present invention, the silane MB and the catalyst MB can be dry-blended before both are melt-mixed. A method and conditions of dry-blending are not particularly limited, and specific examples thereof include dry-mixing and conditions in the step (a-1). The masterbatch mixture containing the silane MB and the catalyst MB is obtained, by this dry-blending.

In this way, the steps (a) to (c) {step (1)} are performed, so that the silane crosslinkable rubber composition can be produced as the reaction composition.

In the step (1), the steps (a) to (c) can be performed at the same time or in succession.

In the method of producing the silane crosslinkable rubber formed body of the present invention, next, a step (2) of obtaining the formed body by forming the reaction composition obtained is performed. This step (2) only needs to be capable of forming the reaction composition, and a forming method and forming conditions are appropriately selected according to a form of the formed body. Specific examples of the forming method include extrusion forming using an extruder, injection forming using an injection forming machine, and forming using any other forming machine. The extrusion forming is preferable when the formed body is the electric wire or the optical fiber cable.

In a case where the step (2) is performed by extrusion-forming, the forming speed (extrusion speed) is not particularly limited. Ordinarily, it can be set to a linear speed of 1 to 10 m/min, preferably 3 to 8 m/min.

As mentioned above, the present invention allows maintenance of excellent outer appearance of the formed body, even if a melt-mixture (forming material) of a silane MB and a catalyst MB is formed at a high speed. Accordingly, in the production method of the present invention, in a case of the extrusion-forming, the linear speed can be set beyond the normally set range. For example, the linear speed can be set to 10 m/min or more, and if needed, to 30 m/min or more.

The step (2) can be performed simultaneously with the step (c) or both steps can be continuously performed. That is, specific examples of one embodiment of the melt-mixing in the step (c) include an aspect of melt-mixing a forming raw material, in the melt-forming, for example, in the extrusion forming, or immediately before the extrusion forming. For example, pellets may be blended with each other at ordinary temperature or a high temperature, such as dry blend, and then placed (melt-mixed) in a forming machine, or the pellets may be blended, and then melt-mixed, re-pelletized, and then placed in a forming machine. More specifically, a series of steps can be employed in which a mixture (forming-raw materials) of the silane MB and the silanol condensation catalyst is melt-kneaded in a coating device, and subsequently, extruded and coated on a periphery of a conductor or the like, and formed into a desired shape.

Thus, the formed body of the heat-resistant crosslinkable fluororubber composition is obtained, in which the silane masterbatch and the silanol condensation catalyst are dry-blended, to prepare the masterbatch mixture, and the masterbatch mixture is introduced into the forming machine and formed.

Here, a melt mixture of the masterbatch mixture (the reaction composition) contains the silane crosslinkable rubber with different crosslinking methods. In this silane crosslinkable rubber, the reaction site (i.e. a hydrolysable silyl group) of the silane coupling agent may be bonded or adsorbed to the inorganic filler, but is not subjected to silanol condensation as described later. Accordingly, the silane crosslinkable rubber contains at least the crosslinkable rubber in which the silane coupling agent bonded or adsorbed to the inorganic filler is grafted to the base rubber (i.e. the fluororubber, the ethylene/tetrafluoroethylene copolymer resin, and the like), and the crosslinkable rubber in which the silane coupling agent neither bonded nor adsorbed to the inorganic filler is grafted to the base rubber. In addition, the silane crosslinkable rubber may have the silane coupling agent to which the inorganic filler is bonded or adsorbed, and the silane coupling agent to which the inorganic filler is neither bonded nor adsorbed. Further, the silane crosslinkable rubber may contain the base rubber component unreacted with the silane coupling agent.

The silane crosslinkable rubber is dynamically crosslinked in a case where it contains, as the base rubber, an ethylene/vinyl acetate copolymer resin, an ethylene/(meth) acrylic acid ester copolymer resin, an ethylene/(meth)acrylic acid copolymer resin, or an acrylic rubber, or a combination thereof. Here, an expression "dynamically crosslinked" means causing partial crosslinking of at least one kind of the resin or the rubber described above, in a state of melt-mixing of the masterbatch mixture, in the presence of the organic peroxide (in mixing or kneading), or a state of being crosslinked. Flowability is lowered by this dynamic crosslinking (for example, Mooney viscosity is enhanced, or a melt flow rate (MFR) is lowered). This dynamic crosslinking is formed in mixing in the step (a) and/or the step (c) described above.

As described above, the silane crosslinkable rubber is an uncrosslinked product in which the silane coupling agent is not subjected to silanol condensation. Practically, if the melt-mixing is performed in the step (c), crosslinking of a part (partial crosslinking) is inevitable, but at least formability in forming is to be kept on the heat-resistant crosslinkable fluororubber composition to be obtained.

In the formed body to be obtained through the step (2), partial crosslinking is inevitable in a manner similar to the above-described mixture, but the formed body is in a partially crosslinked state of keeping formability at which the composition can be formed in the step (2). Accordingly, this heat-resistant crosslinked fluororubber formed body of the present invention is obtained as the formed body crosslinked or finally crosslinked, by performing the step (3).

In the method of producing the heat-resistant crosslinked fluororubber formed body of the present invention, the step (3) of bringing the formed body obtained in the step (2) into contact with water is performed. Thus, the reaction site of the silane coupling agent, which is capable of silanol condensation, is hydrolyzed into silanol, and hydroxyl groups of the silanol are subjected to condensation by the silanol condensation catalyst existing in the formed body, and the crosslinking reaction occurs. Thus, the heat-resistant crosslinked fluororubber formed body in which the silane coupling agent is subjected to silanol condensation and crosslinked can be obtained.

The treatment itself in this step (3) can be carried out according to an ordinary method. The condensation reaction between the silane coupling agents progresses just in storage at ordinary temperature. Accordingly, in the step (3), it is unnecessary to positively bring the formed body into contact with water. In order to accelerate this crosslinking reaction, the formed body can also be brought into contact with moisture. For example, the method of positively bringing the formed body into contact with water can be employed, such as immersion into warm water, placement in a wet heat bath, and exposure to high temperature water vapor. In addition, pressure may be applied to in order to penetrate moisture thereinto on the above occasion.

Thus, the method of producing the heat-resistant crosslinked fluororubber formed body of the present invention is performed, and the heat-resistant crosslinked fluororubber formed body is produced. This heat-resistant crosslinked fluororubber formed body contains the silane-crosslinked product of the base rubber, that is, the crosslinked rubber or the crosslinked resin (these are collectively referred to as the crosslinked fluororubber) in which the (silane-crosslinkable) rubber or resin has been subjected to condensation through a silanol bond (a siloxane bond). As one form of this silane crosslinked fluororubber formed body, the formed body contains the silane crosslinked fluororubber and the inorganic filler. Here, the inorganic filler may be bonded to the silane coupling agent of the silane crosslinked fluororubber. Accordingly, the present invention includes an aspect in which the base rubber is crosslinked with the inorganic filler through the silanol bonding. Specifically, the silane crosslinked fluororubber contains at least the crosslinked fluororubber in which a plurality of base rubbers are bonded or adsorbed to the inorganic filler by the silane coupling agent and are bonded (crosslinked) through the inorganic filler and the silane coupling agent, and the crosslinked fluororubber in which the reaction sites of the above-described crosslinkable rubber with the silane coupling agent are hydrolyzed to cause the silanol condensation reaction with each other, whereby the crosslinkable rubber is crosslinked through the silane coupling agent. In addition, in the silane crosslinked fluororubber, the bonding (crosslinkage) through the inorganic filler and the silane coupling agent, and the crosslinkage through the silane coupling agent, may be mixed. Further, the silane crosslinkable rubber may contain the rubber component unreacted with the silane coupling agent and/or an uncrosslinked silane crosslinkable rubber.

This crosslinked fluororubber may be further dynamically crosslinked in some cases, as mentioned above, with regard to the silane crosslinkable rubber.

Details of a reaction mechanism in the production method of the present invention are unknown yet, but it is considered as described below.

In general, if the organic peroxide is added to the base rubber, especially to the fluororubber, a radical is rapidly generated, to facilitate occurrence of the crosslinking reaction between the base rubbers or the decomposition reaction thereof. Thus, the aggregated substance (the foreign matters) is generated in the obtained heat-resistant crosslinked fluororubber formed body and the physical property thereof are lowered.

However, in the present invention, in the step (1), by making the inorganic filler coexist in decomposition reaction of the organic peroxide, the silane coupling agent is bonded to the inorganic filler through a silanol bond, a hydrogen bond, or an intermolecular bond. In particular, in the preferred embodiment of the step (1), the treatment for occurring the bonding, and the melt-mixing treatment are conducted separately. Thus, it is considered that a chance of causing the grafting reaction between the grafting reaction site of the silane coupling agent and the base rubber is increased. It is considered that a reaction of boding this kept silane coupling agent to the radical generated in the base rubber becomes dominant over the crosslinking reaction between the base rubbers or the decomposition reaction as described above. Accordingly, the grafting reaction (silane crosslinking) of the silane coupling agent to the base rubber can be made, and deterioration by, for example, the decomposition reaction of the base rubber, particularly, of the fluororubber, or the crosslinking reaction between the base rubbers in the reaction {the step (1)} is not caused. Therefore, it is considered that generation of the aggregated substance or lowering of the physical property is hard to occur.

In a case where the step (a) includes the step (a-1) and the step (a-2), a higher level of heat resistance can be given to the heat-resistant crosslinked fluororubber formed body.

When these components are kneaded (melt-mixed) in the step (a-2), the silane coupling agent bonded or adsorbed to the inorganic filler by weak bonding (interaction by the hydrogen bonding, interaction between ions, partial charges or dipoles, action by adsorption, or the like) is detached from the inorganic filler, resulting in causing the grafting reaction with the base rubber. In the silane coupling agent thus graft-reacted, the reaction sites capable of silanol condensation are subjected to the condensation reaction (crosslinking reaction) to form the base rubber, especially fluororubber, crosslinked through the silanol condensation. The heat resistance of the heat-resistant crosslinked fluororubber formed body obtained through this crosslinking reaction is enhanced.

On the other hand, in the silane coupling agent bonded to the inorganic filler by strong bonding (chemical bonding with the hydroxyl group or the like on the surface of the inorganic filler, or the like), this condensation reaction by the silanol condensation catalyst in the presence of water is hard to occur, and bonding with the inorganic filler is kept. Therefore, bonding (crosslinking) of the fluororubber with the inorganic filler through the silane coupling agent is formed. Thus, adhesion between the fluororubber and the inorganic filler is consolidated, and the formed body that is excellent in mechanical strength and abrasion resistance and hard to be scratched is obtained. In particular, a plurality of silane coupling agents can be bonded to one inorganic filler particle surface, and high mechanical strength can be obtained.

It is presumed that by forming these silane crosslinkable rubber or silane graft polymer together with the silanol condensation catalyst, and then bringing it to contact with moisture, the crosslinked fluororubber formed body exhibiting high heat-resistance can be obtained.

In the present invention, the heat-resistant crosslinked fluororubber formed body having high heat resistance can be obtained by mixing the organic peroxide in a ratio of 0.003 part by mass or more, preferably 0.005 part by mass or more, and 0.5 part by mass or less, preferably 0.2 part by mass or less, and further by mixing the silane coupling agent in a ratio of 2 to 15 parts by mass, with respect to 100 parts by mass of the base rubber, in the presence of the inorganic filler.

In the present invention, when the fluororubber and the ethylene/tetrafluoroethylene copolymer resin are contained in the base rubber, in addition to the above-described properties, the silane masterbatch and the catalyst masterbatch can be prepared as pellets that suppress foaming (residue of bubbles) and are difficult to fuse, and also mechanical strength (for example, tensile strength) and outer appearance of the formed body obtained are enhanced. The reason is considered as follows.

When the fluororubber and the ethylene/tetrafluoroethylene copolymer resin are contained in the base rubber, there is no need to set to overly high temperature in preparation (melt-kneading) of the masterbatch in the step (a) and the step (b), whereby foaming can be suppressed because volatilization of the silane coupling agent can be suppressed. In particular, in a preferable aspect of containing the ethylene/tetrafluoroethylene copolymer resin having the melting point of 230° C. or less, the foaming can be suppressed even more. Further, when the masterbatch containing the fluororubber is pelletized, the pellets tend to be fused together. However, by mixing with the ethylene/tetrafluoroethylene copolymer resin, a surface hardness is enhanced, whereby pellets with suppressed fusion can be obtained. When the fluororubber and the ethylene/tetrafluoroethylene copolymer resin are contained in the base rubber, the fluororubber and the ethylene/tetrafluoroethylene copolymer resin are immingled and more homogeneous reaction composition can be obtained in the step (c). Therefore, it is considered that when brought to contact with water in the step (3), a silane crosslinked structure is formed without variation in the formed body, whereby mechanical strength is enhanced. Further, it is considered that a formed body can be produced while maintaining excellent outer appearance even formed upon a high-speed forming.

In the present invention, when an ethylene/vinyl acetate copolymer resin, an ethylene/(meth)acrylic acid ester copolymer resin, or an ethylene/(meth)acrylic acid copolymer resin, or an acrylic rubber, or a combination thereof is contained in the base rubber, mechanical strength of the heat-resistant crosslinked fluororubber formed body is further enhanced.

It is considered that the reason why the mechanical strength is further enhanced is that the fluororubber, the ethylene/tetrafluoroethylene copolymer resin, and any of the resins, such as an ethylene/vinyl acetate copolymer, are dynamically crosslinked with each other in melt-kneading (in progress of the silane grafting reaction) and/or in forming, to thereby reinforce a silane crosslinked structure.

In the present invention, the ratio of the silane crosslinked structure and the dynamically crosslinked structure is not particularly limited, but is appropriately selected according to the intended use or the like. This ratio may be set to a predetermined value, depending on, for example, a blending amount of the silane coupling agent, a blending amount of the organic peroxide, a forming temperature.

The production method of the present invention can be applied to manufacture of a product that requires heat resistance (also including half-finished products, parts, and members), and further a product that requires mechanical strength, a product that requires flame retardancy, a component part or a member of the product, such as a rubber material and the like. Accordingly, the heat-resistant products of the present invention are identified as the forgoing products. Herein, the heat-resistant products may be a product containing the heat-resistant crosslinked fluororubber formed body, or may be a product consisting of only the heat-resistant crosslinked fluororubber formed body.

Examples of the heat-resistant products of the present invention include: electric wires, such as heat-resistant flame-retardant insulated wires and the like; coating materials for heat-resistant flame-retardant cables or optical fiber cables; rubber substitute wire or cable materials; as for the rest, heat-resistant parts for microwave or gas range; heat-resistant flame-retardant wire parts; flame-retardant heat-resistant sheets; and flame-retardant heat-resistant films. Further, examples thereof include: power plugs; connectors; sleeves; boxes; tape substrate (tape materials); tubes; sheets; packings; cushion materials; vibration-proof materials; and wiring materials to be used for internal wiring or external wiring of electric or electronic pieces of equipment, in particular, electric wires or optical fiber cables.

Among the above described products, the production method of the present invention is particularly preferably applied to production of electric wire and optical fiber cable, and it can form a coating material (i.e. an insulator, a sheath) thereof.

When the heat-resistant product of the present invention is an extrusion formed article, such as the electric wire or the optical fiber cable, the product can be produced, preferably, while forming materials are melt-kneaded in the extruder (extrusion coating device) to prepare the heat-resistant crosslinkable fluororubber composition, by extruding this heat-resistant crosslinkable fluororubber composition on an outer periphery of a conductor or the like, to coat the conductor or the like. Such a heat-resistant product can be formed, by extruding and coating the heat-resistant crosslinkable fluororubber composition, even if a large amount of inorganic fillers is added thereto, on a circumference of a conductor or a circumference of a conductor longitudinally lapped or twisted with tensile strength fibers, by using a general-purpose extrusion coating device, without using a special machine, such as an electron beam crosslinking machine. For example, as the conductor, a single wire, a stranded wire or the like of annealed copper can be used. Moreover, as the conductor, in addition to a bare wire, a tin-plated conductor or a conductor having an enamel-coating insulation layer can be used. A thickness of the insulation layer (coating layer formed of the heat resistant crosslinked fluororubber formed body of the present invention) formed around the conductor is not particularly limited, but is generally about 0.15 to 10 mm.

EXAMPLES

The present invention will be described in more detail based on examples given below, but the invention is not meant to be limited by these.

In Table 1, the numerical values for the content of the respective Examples and Comparative Examples are in terms of part by mass, unless otherwise specified.

Examples and Comparative Examples were carried out by using the following components, and setting respective specifications to conditions shown in Table 1, and the results of evaluation as mentioned later are collectively shown in Table 1.

Details of each compound listed in Table 1 are described below.

A fluorine content of fluororubber is expressed in terms of a value according to the above-described "potassium carbonate pyrohydrolysis method".
<Base rubber>
(Fluororubber)
"AFLAS 400E" (trade name, manufactured by AGC Asahi Glass Co., Ltd., tetrafluoroethylene/propylene copolymer rubber, fluorine content: 57% by mass) (Fluororesin)
"LH-8000" (trade name, manufactured by Asahi Glass Co., Ltd., resin of ethylene/tetrafluoroethylene (ETFE) copolymer, melting point: 180° C.)
"EP620" (trade name, manufactured by Daikin Industries, Ltd., resin of ethylene/tetrafluoroethylene (ETFE) copolymer, melting point: 210° C.)
"RP-4020" (trade name, manufactured by Daikin Industries, Ltd., resin of ethylene/tetrafluoroethylene/hexafluoropropylene (EFEP) copolymer, melting point: 160° C.)
"KAYNER740" (trade name, manufactured by ARKEMA Ltd., polyvinylidene fluoride (PVDF) resin, melting point: 170° C.) "NP-101" (trade name, manufactured by Daikin Industries, Ltd., resin of tetrafluoroethylene/hexafluoropropylene (FEP) copolymer, melting point: 270° C.)
"AP-210" (trade name, manufactured by Daikin Industries, Ltd., resin of tetrafluoroethylene/perfluoroalkylvinylether (PFA) copolymer, melting point: 310° C.)
(Other Components)
"VF120T" (trade name, manufactured by Ube Industries, Ltd., resin of ethylene/vinyl acetate copolymer, vinyl acetate content: 20% by mass)
<Organic Peroxide>
"PERHEXA 25B" (trade name, manufactured by NOF Corporation, 2,5-dimethyl-2,5-di(tert-butylperoxy)hexane, decomposition temperature 149° C.)

<Inorganic Filler>
"Zinc Oxide No. 1" (trade name, manufactured by Mitsui Mining & Smelting Co., Ltd., zinc oxide)
"SOFTON 1200" (trade name, manufactured by BIHOKU FUNKA KOGYO Co., Ltd., calcium carbonate)
"Aerosil 200" (trade name, manufactured by Nippon Aerosil Co., Ltd., hydrophilic fumed silica, amorphous silica)
"CRYSTALITE 5X" (trade name, manufactured by Tatsumori Ltd., crystalline silica)
"Satitone SP-33" (trade name, manufactured by Engelhard Corporation, calcined clay)
"MV Talc" (trade name, manufactured by Nihon Mistron Co., Ltd., talc)
<Silane Coupling Agent>
"KBM-1003" (trade name, manufactured by Shin-Etsu Chemical Co., Ltd., vinyltrimethoxysilane)
"KBE-1003" (trade name, manufactured by Shin-Etsu Chemical Co., Ltd., vinyltriethoxysilane)
<Silanol Condensation Catalyst>
"ADKSTAB OT-1" (trade name, manufactured by ADEKA Corporation, dioctyltin dilaurate)
<Antioxidizing Agent>
"IRGANOX 1010" (trade name, manufactured by BASF, pentaerythritol tetrakis[3-(3,5-di-tert-butyl-4-hydroxyphenyl)propionate])

Examples 1 to 23 and Comparative Examples 1 to 14

In Examples 1 to 23, a part of the base rubber (containing the fluororubber and the ethylene/tetrafluoroethylene copolymer resin in every Example) was used as the carrier rubber of the catalyst MB.

Further, in Comparative Examples 1 to 14, a part of the base rubber was used as the carrier rubber of the catalyst MB.

In Examples 1 to 5, 8 to 21 and 23, and Comparative Examples 1 to 6 and 9 to 14, the silane MB was obtained as follows. First, the inorganic filler and the silane coupling agent, in mass ratios listed in Table 1, were placed in a 10 L Henschel mixer manufactured by Toyo Seiki Seisaku-sho, Ltd. and the resultant mixture was mixed at room temperature (25° C.) for 1 hour, to obtain a powder mixture (the step (a-1)). Next, the power mixture thus obtained, and each component listed in the base rubber column and the organic peroxide in Table 1, in mass ratios listed in Table 1, were placed in a 2 L Banbury mixer manufactured by Nippon Roll MFG. Co., Ltd., and the resultant mixture was kneaded at a temperature equal to or higher than a decomposition temperature of the organic peroxide, specifically, at 190° C., for 10 minutes, and then discharged at a material discharge temperature of 200° C., to obtain a silane MB (the step (a-2)).

Further, in Examples 6, 7 and 22, a silane MB was obtained in the same manner as the silane MB in Example 1, except for melt-mixing a mixture with a Banbury mixer at a temp. range of 200 to 225° C. and discharging the mixture therefrom at a material discharge temperature of 225° C., because the ethylene/tetrafluoroethylene copolymer resin having a melting point of 210° C. was used as a part of the base rubber.

In Comparative Examples 7 and 8, a preparation of the silane MB was performed in the same manner as the the silane MB in Example 1, except for melt-mixing a mixture with a Banbury mixer at a temp. range of 320 to 325° C. and discharging the mixture therefrom at a material discharge temperature of 325° C.

The silane MB obtained contains a silane crosslinkable rubber in which the silane coupling agent is graft-reacted onto the base rubber.

On the other hand, in Examples 1 to 20 and 23 and Comparative Examples 1 to 14, the catalyst MB was prepared as follows. The carrier rubber, the silanol condensation catalyst and the antioxidant were melt-mixed at a temperature of 180 to 190° C. in the mass ratio shown in Table 1 by a Banbury mixer, and the resultant melt-mixture was discharged therefrom at a material discharge temperature of 180 to 190° C., to obtain the catalyst MB (the step (b)).

In Examples 21 and 22, the catalyst MB was obtained in the same manner as in Example 1, except for melt-mixing the mixture with a Banbury mixer at a temp. range of 220 to 225° C. and discharging the mixture therefrom at a material discharge temperature of 225° C.

Next, the thus-prepared silane MB and catalyst MB were casted to (charged into) a closed ribbon blender, and they were subjected to dry-blending at room temperature (25° C.) for 5 minutes, to obtain a dry blended product (the masterbatch mixture).

Next, the dry-blended product obtained was introduced to an extruder (compression zone screw temperature of 170° C., head temperature of 220° C.) equipped with a screw having specifications of L/D (a ratio of an effective length L and a diameter D of the screw)=24 and a screw diameter 30 mm. Further, in Comparative Examples 7 and 8, the head temperature was set to 330° C. While melt-mixing the dry-blended product in this extruder (the step (c)), the melt-mixture was coated on the outside of the 1/0.8 TA conductor composed of a bare annealed copper wire so that the thickness thereof was 1 mm, and extrusion-coating was performed at a linear velocity of 10 m/min so that the outside diameter thereof was 2.8 mm, to thereby obtain a coated conductor (the step (2)). This coated conductor was left to stand for 1 week under the circumstance of temperature of 40° C. and humidity of 95% (the step (3)).

In this way, the electric wire was produced, which had the coating layer composed of the heat-resistant crosslinked fluororubber formed body provided on the outer periphery of the above-described conductor. The heat-resistant crosslinked fluororubber formed body, as a coating layer, contains the above-described silane crosslinked fluororubber.

Meanwhile, in Comparative Example 12, extrusion forming could not be performed due to excessive crosslinking, so that no coated conductor could be produced.

The heat-resistant crosslinkable fluororubber composition was prepared by melt-mixing the above-described dry-blended product in the extruder before extrusion forming. This heat-resistant crosslinkable fluororubber composition is a melt mixture of the silane MB and the catalyst MB, and contains the above-mentioned silane crosslinkable rubber.

Regarding each pellet and each electric wire produced, the following tests were conducted and the results are shown in Table 1.

<Suitability for Preparation of Silane MB Pellets>

In this test, whether the silane MB could be pelletized as pellets that would suppress foaming and would be difficult to fuse, or not (pellet preparation suitability), was evaluated.

The silane MB obtained as described above was pelletized and evaluation of the pellets obtained was conducted as follows.

Regarding 10 particles randomly selected from pellets of the above-described silane MB, their shapes and cross-sections of the central parts were each observed with an optical microscope. As a result, the case where there was no foam mark (bubble) in the pellet cross-section was expressed as "A (excellent pellets)", the case where although the shape of the pellet was good, slight foam marks were seen in the pellet cross-section was expressed as "B (good pellets)", and the case where the shape of the pellet was bad (or poor), or pellets were fused to each other (were blocked), or remarkable foam marks were seen in the pellet cross-section was expressed as "D (poor)". The evaluation "B" or greater, i.e. any of A or B, is a pass level of this test.

Further, the expression "slight foam marks" means such a degree that there are less than 10 bubbles having a diameter of 100 μm or less, and the expression "remarkable foam marks" means that there are 10 or more bubbles having a diameter of 100 μm or more.

<Suitability for Preparation of Catalyst MB Pellets>

In this test, whether the catalyst MB could be pelletized as pellets that would suppress foaming and would be difficult to fuse, or not, was evaluated.

The catalyst MB obtained as described above was pelletized and evaluation of the pellets obtained was conducted as follows.

Regarding 10 particles randomly selected from pellets of the above-described catalyst MB, their shapes and cross-sections of the central parts were each observed with an optical microscope. As a result, the case where the shape of the pellet was good and there was no foam mark (bubble) in the pellet cross-section was expressed as "A (excellent pellets)", and the case where the shape of the pellet was bad, or pellets were fused to each other (were blocked) was expressed as "D (poor)". The evaluation "A" is a pass level of this test.

<Length Formability>

In the production of the above-described electric wire, the electric wire having a coating layer composed of the heat-resistant crosslinked fluororubber formed body was produced in the same manner as the production of the above-described electric wire, and the outer appearance of the coating layer of the electric wire obtained was observed, to evaluate length formability. The case where none of gel-aggregated substance and foaming etc. were seen and a coated layer being smooth (or unstriated) and having good outer appearance was obtained even at a linear speed of 50 m/min, was expressed as "A (extremely excellent)"; the case where as long as a linear speed was 40 m/min or more and less than 50 m/min, a coated layer being smooth and having good outer appearance was obtained, was expressed as "B (excellent)"; the case where as long as a linear speed was 30 m/min or more and less than 40 m/min, a coated layer being smooth and having good outer appearance was obtained, was expressed as "C (good)"; the case where as long as a linear speed was 15 m/min or more and less than 30 m/min, a coated layer being smooth and having good outer appearance was obtained, was expressed as "D (possible)"; and the case where pellets were blocked to a remarkable extent and extrusion forming was impossible even at a linear speed of less than 15 m/min, was expressed as "E (poor)". The evaluation "D" or greater, i.e. any of A, B, C or D, is a pass level of this test.

The expression "-" in the table represents that this evaluation was not conducted.

<Mechanical Property (Tensile Strength)>

In this test, tensile strength was evaluated as an index of the mechanical property.

The tensile strength (MPa) of the tubular piece, which was prepared by extracting a conductor from each electric wire obtained under conditions of a linear speed of 10 m/min, was measured under conditions of a gauge length of 20 mm and a tensile speed of 200 mm/min, based on JIS C 3005.

The case where the tensile strength was 14 MPa or more was expressed as "A (extremely excellent)", the case where the tensile strength was 11 MPa or more and less than 14 MPa was expressed as "B (excellent)", the case where the tensile strength was 8.5 MPa or more and less than 11 MPa was expressed as "C (good)", the case where the tensile strength was 5.0 MPa or more and less than 8.5 MPa was expressed as "D", and the case where the tensile strength was less than 5.0 MPa was expressed as "E". The evaluation "C" or greater, i.e. any of A, B or C, is a pass level of this test.

The expression "-" in the table represents that this evaluation was not conducted.

TABLE 1

|  |  |  |  | Examples |  |  |  |  |  |  |  |
|---|---|---|---|---|---|---|---|---|---|---|---|
|  |  |  |  | 1 | 2 | 3 | 4 | 5 | 6 | 7 | 8 |
| Si MB | base rubber | fluororubber | AFLAS 400E | 59 | 57 | 50 | 35 | 30 | 50 | 80 | 50 |
|  |  | EVA | VF 120T | 20 | 20 | 20 | 20 | 20 | 20 |  | 20 |
|  |  | ETFE resin | LH-8000 (m.p. 180° C.) | 1 | 3 | 10 | 25 | 30 |  |  | 10 |
|  |  | ETFE resin | EP-620 (m.p. 210° C.) |  |  |  |  |  | 10 | 10 |  |
|  |  | EFEP resin | RP4020 (m.p. 160° C.) |  |  |  |  |  |  |  |  |
|  |  | PVDF resin | KAYNER740 (m.p. 170° C.) |  |  |  |  |  |  |  |  |
|  |  | FEP resin | NP-101 (m.p. 270° C.) |  |  |  |  |  |  |  |  |
|  |  | PFA resin | AP-210 (m.p. 310° C.) |  |  |  |  |  |  |  |  |
|  | organic peroxide |  | PERHEXA 25B | 0.2 | 0.2 | 0.2 | 0.2 | 0.2 | 0.2 | 0.2 | 0.003 |
|  | inorganic filler | zinc oxide | Zinc Oxide No. 1 | 5 | 5 | 5 | 5 | 5 | 5 | 5 | 5 |
|  |  | calcium carbonate | SOFTON 1200 |  |  |  |  |  |  |  |  |
|  |  | silica | Aerosil 200 |  |  |  |  |  |  |  |  |
|  |  | silica | CRYSTALITE 5X | 50 | 50 | 50 | 50 | 50 | 50 | 50 | 50 |
|  |  | calcined clay | Satitone SP-33 |  |  |  |  |  |  |  |  |
|  |  | talc | MV Talc |  |  |  |  |  |  |  |  |
|  | Si-coupling agent | vinyl trimethoxysilane | KBM-1003 | 5 | 5 | 5 | 5 | 5 | 5 | 5 | 5 |
|  |  | vinyl triethoxysilane | KBE-1003 |  |  |  |  |  |  |  |  |
| cat. MB | carrier rubber | fluororubber | AFLAS 400E | 10 | 10 | 10 | 10 | 10 | 10 | 5 | 10 |
|  |  | ETFE resin | LH-8000 (m.p. 180° C.) | 10 | 10 | 10 | 10 | 10 | 10 | 5 | 10 |
|  |  | ETFE resin | EP-620 (m.p. 210° C.) |  |  |  |  |  |  |  |  |
|  | Si—OH cond. cat. | dioctyltin dilaurate | ADKSTAB OT-1 | 0.05 | 0.05 | 0.05 | 0.05 | 0.05 | 0.05 | 0.05 | 0.05 |
|  | antioxidant |  | IRGANOX 1010 | 0.1 | 0.1 | 0.1 | 0.1 | 0.1 | 0.1 | 0.1 | 0.1 |
| Evaluation |  | Suitability for prep. of pellets (Si MB) |  | B | A | A | A | B | B | B | A |
|  |  | Suitability for prep. of pellets (cat. MB) |  | A | A | A | A | A | A | A | A |
|  |  | Length formability |  | C | B | A | B | D | A | A | A |
|  |  | TS |  | C | B | A | A | A | A | B | C |

|  |  |  |  | Examples |  |  |  |  |  |  |  |
|---|---|---|---|---|---|---|---|---|---|---|---|
|  |  |  |  | 9 | 10 | 11 | 12 | 13 | 14 | 15 | 16 |
| Si MB | base rubber | fluororubber | AFLAS 400E | 50 | 50 | 50 | 50 | 50 | 50 | 50 | 50 |
|  |  | EVA | VF 120T | 20 | 20 | 20 | 20 | 20 | 20 | 20 | 20 |
|  |  | ETFE resin | LH-8000 (m.p. 180° C.) | 10 | 10 | 10 | 10 | 10 | 10 | 10 | 10 |
|  |  | ETFE resin | EP-620 (m.p. 210° C.) |  |  |  |  |  |  |  |  |
|  |  | EFEP resin | RP4020 (m.p. 160° C.) |  |  |  |  |  |  |  |  |
|  |  | PVDF resin | KAYNER740 (m.p. 170° C.) |  |  |  |  |  |  |  |  |
|  |  | FEP resin | NP-101 (m.p. 270° C.) |  |  |  |  |  |  |  |  |
|  |  | PFA resin | AP-210 (m.p. 310° C.) |  |  |  |  |  |  |  |  |
|  | organic peroxide |  | PERHEXA 25B | 0.005 | 0.5 | 0.2 | 0.2 | 0.2 | 0.2 | 0.2 | 0.2 |
|  | inorganic filler | zinc oxide | Zinc Oxide No. 1 | 5 | 5 | 5 |  | 5 | 5 | 5 | 5 |
|  |  | calcium carbonate | SOFTON 1200 |  |  |  | 50 |  | 395 |  |  |
|  |  | silica | Aerosil 200 |  |  |  |  | 0.5 |  |  |  |
|  |  | silica | CRYSTALITE 5X | 50 | 50 |  |  |  |  |  | 50 |
|  |  | calcined clay | Satitone SP-33 |  |  |  |  |  |  | 50 |  |
|  |  | talc | MV Talc |  |  |  |  |  |  | 50 |  |
|  | Si-coupling agent | vinyl trimethoxysilane | KBM-1003 | 5 | 5 | 5 | 5 | 5 | 5 | 5 | 2 |
|  |  | vinyl triethoxysilane | KBE-1003 |  |  |  |  |  |  |  |  |
| cat. MB | carrier rubber | fluororubber | AFLAS 400E | 10 | 10 | 10 | 10 | 10 | 10 | 10 | 10 |
|  |  | ETFE resin | LH-8000 (m.p. 180° C.) | 10 | 10 | 10 | 10 | 10 | 10 | 10 | 10 |
|  |  | ETFE resin | EP-620 (m.p. 210° C.) |  |  |  |  |  |  |  |  |
|  | Si—OH cond. cat. | dioctyltin dilaurate | ADKSTAB OT-1 | 0.05 | 0.05 | 0.05 | 0.05 | 0.05 | 0.05 | 0.05 | 0.05 |
|  | antioxidant |  | IRGANOX 1010 | 0.1 | 0.1 | 0.1 | 0.1 | 0.1 | 0.1 | 0.1 | 0.1 |
| Evaluation |  | Suitability for prep. of pellets (Si MB) |  | A | B | A | A | B | A | A | A |
|  |  | Suitability for prep. of pellets (cat. MB) |  | A | A | A | A | A | A | A | A |
|  |  | Length formability |  | A | B | A | B | C | A | A | A |
|  |  | TS |  | C | A | B | C | C | B | B | C |

TABLE 1-continued

| | | | | Examples | | | |
|---|---|---|---|---|---|---|---|
| | | | | 17 | 18 | 19 | 20 |
| Si MB | base rubber | fluororubber | AFLAS 400E | 50 | 50 | 50 | 50 |
| | | EVA | VF 120T | 20 | 20 | 20 | 20 |
| | | ETFE resin | LH-8000 (m.p. 180° C.) | 10 | 10 | 10 | 10 |
| | | ETFE resin | EP-620 (m.p. 210° C.) | | | | |
| | | EFEP resin | RP4020 (m.p. 160° C.) | | | | |
| | | PVDF resin | KAYNER740 (m.p. 170° C.) | | | | |
| | | FEP resin | NP-101 (m.p. 270° C.) | | | | |
| | | PFA resin | AP-210 (m.p. 310° C.) | | | | |
| | organic peroxide | | PERHEXA 25B | 0.2 | 0.2 | 0.2 | 0.2 |
| | inorganic filler | zinc oxide | Zinc Oxide No. 1 | 5 | 5 | 5 | 5 |
| | | calcium carbonate | SOFTON 1200 | | | | |
| | | silica | Aerosil 200 | | | | |
| | | silica | CRYSTALITE 5X | 50 | 50 | 50 | 50 |
| | | calcined clay | Satitone SP-33 | | | | |
| | | talc | MV Talc | | | | |
| | Si-coupling agent | vinyl trimethoxysilane | KBM-1003 | 3 | 4 | 12 | 15 |
| | | vinyl triethoxysilane | KBE-1003 | | | | |
| cat. MB | carrier rubber | fluororubber | AFLAS 400E | 10 | 10 | 10 | 10 |
| | | ETFE resin | LH-8000 (m.p. 180° C.) | 10 | 10 | 10 | 10 |
| | | ETFE resin | EP-620 (m.p. 210° C.) | | | | |
| | Si—OH cond. cat. | dioctyltin dilaurate | ADKSTAB OT-1 | 0.05 | 0.05 | 0.05 | 0.05 |
| | antioxidant | | IRGANOX 1010 | 0.1 | 0.1 | 0.1 | 0.1 |
| Evaluation | | Suitability for prep. of pellets (Si MB) | | A | A | A | B |
| | | Suitability for prep. of pellets (cat. MB) | | A | A | A | A |
| | | Length formability | | A | A | B | C |
| | | TS | | C | B | A | A |

| | | | | Examples | | |
|---|---|---|---|---|---|---|
| | | | | 21 | 22 | 23 |
| Si MB | base rubber | fluororubber | AFLAS 400E | 50 | 50 | 50 |
| | | EVA | VF 120T | 20 | 20 | 20 |
| | | ETFE resin | LH-8000 (m.p. 180° C.) | 10 | | 10 |
| | | ETFE resin | EP-620 (m.p. 210° C.) | | 10 | |
| | | EFEP resin | RP4020 (m.p. 160° C.) | | | |
| | | PVDF resin | KAYNER740 (m.p. 170° C.) | | | |
| | | FEP resin | NP-101 (m.p. 270° C.) | | | |
| | | PFA resin | AP-210 (m.p. 310° C.) | | | |
| | organic peroxide | | PERHEXA 25B | 0.2 | 0.2 | 0.2 |
| | inorganic filler | zinc oxide | Zinc Oxide No. 1 | 5 | 5 | 5 |
| | | calcium carbonate | SOFTON 1200 | | | |
| | | silica | Aerosil 200 | | | |
| | | silica | CRYSTALITE 5X | 50 | 50 | 50 |
| | | calcined clay | Satitone SP-33 | | | |
| | | talc | MV Talc | | | |
| | Si-coupling agent | vinyl trimethoxysilane | KBM-1003 | 5 | 5 | |
| | | vinyl triethoxysilane | KBE-1003 | | | 5 |
| cat. MB | carrier rubber | fluororubber | AFLAS 400E | 10 | 10 | 10 |
| | | ETFE resin | LH-8000 (m.p. 180° C.) | | | 10 |
| | | ETFE resin | EP-620 (m.p. 210° C.) | 10 | 10 | |
| | Si—OH cond. cat. | dioctyltin dilaurate | ADKSTAB OT-1 | 0.05 | 0.05 | 0.05 |
| | antioxidant | | IRGANOX 1010 | 0.1 | 0.1 | 0.1 |
| Evaluation | | Suitability for prep. of pellets (Si MB) | | A | B | A |
| | | Suitability for prep. of pellets (cat. MB) | | A | A | A |
| | | Length formability | | A | A | A |
| | | TS | | A | A | B |

| | | | | Comparative Examples | | | |
|---|---|---|---|---|---|---|---|
| | | | | 1 | 2 | 3 | 4 |
| Si MB | base rubber | fluororubber | AFLAS 400E | 90 | 60 | 60 | 10 |
| | | EVA | VF 120T | | 20 | 20 | 20 |
| | | ETFE resin | LH-8000 (m.p. 180° C.) | | | 10 | 50 |
| | | ETFE resin | EP-620 (m.p. 210° C.) | | | | |
| | | EFEP resin | RP4020 (m.p. 160° C.) | | | | |
| | | PVDF resin | KAYNER740 (m.p. 170° C.) | | | | |
| | | FEP resin | NP-101 (m.p. 270° C.) | | | | |
| | | PFA resin | AP-210 (m.p. 310° C.) | | | | |

TABLE 1-continued

|  |  |  |  |  |  |  |  |
|---|---|---|---|---|---|---|---|
|  | organic peroxide |  | PERHEXA 25B | 0.2 | 0.2 | 0.2 | 0.2 |
|  | inorganic filler | zinc oxide | Zinc Oxide No. 1 | 5 | 5 | 5 | 5 |
|  |  | calcium carbonate | SOFTON 1200 |  |  |  |  |
|  |  | silica | Aerosil 200 |  |  |  |  |
|  |  | silica | CRYSTALITE 5X | 50 | 50 | 50 | 50 |
|  |  | calcined clay | Satitone SP-33 |  |  |  |  |
|  |  | talc | MV Talc |  |  |  |  |
|  | Si-coupling agent | vinyl trimethoxysilane | KBM-1003 | 5 | 5 | 5 | 5 |
|  |  | vinyl triethoxysilane | KBE-1003 |  |  |  |  |
| cat. MB | carrier rubber | fluororubber | AFLAS 400E | 10 | 10 | 10 | 10 |
|  |  | ETFE resin | LH-8000 (m.p. 180° C.) |  |  | 10 | 10 |
|  |  | ETFE resin | EP-620 (m.p. 210° C.) |  |  |  |  |
|  | Si—OH cond. cat. | dioctyltin dilaurate | ADKSTAB OT-1 | 0.05 | 0.05 | 0.05 | 0.05 |
|  | antioxidant |  | IRGANOX 1010 | 0.1 | 0.1 | 0.1 | 0.1 |
| Evaluation |  | Suitability for prep. of pellets (Si MB) |  | D | A | D | D |
|  |  | Suitability for prep. of pellets (cat. MB) |  | D | D | A | A |
|  |  | Length formability |  | E | E | E | E |
|  |  | TS |  | D | D | D | A |

|  |  |  |  | Comparative Examples ||||
|---|---|---|---|---|---|---|---|
|  |  |  |  | 5 | 6 | 7 | 8 |
| Si MB | base rubber | fluororubber | AFLAS 400E | 50 | 50 | 50 | 50 |
|  |  | EVA | VF120T | 20 | 20 | 20 | 20 |
|  |  | ETFE resin | LH-8000 (m.p. 180° C.) |  |  |  |  |
|  |  | ETFE resin | EP-620 (m.p. 210° C.) |  |  |  |  |
|  |  | EFEP resin | RP4020 (m.p. 160° C.) | 10 |  |  |  |
|  |  | PVDF resin | KAYNER740 (m.p. 170° C.) |  | 10 |  |  |
|  |  | FEP resin | NP-101 (m.p. 270° C.) |  |  | 10 |  |
|  |  | PFA resin | AP-210 (m.p. 310° C.) |  |  |  | 10 |
|  | organic peroxide |  | PERHEXA 25B | 0.2 | 0.2 | 0.2 | 0.2 |
|  | inorganic filler | zinc oxide | Zinc Oxide No. 1 | 5 | 5 | 5 | 5 |
|  |  | calcium carbonate | SOFTON 1200 |  |  |  |  |
|  |  | silica | Aerosil 200 |  |  |  |  |
|  |  | silica | CRYSTALITE 5X | 50 | 50 | 50 | 50 |
|  |  | calcined clay | Satitone SP-33 |  |  |  |  |
|  |  | talc | MV Talc |  |  |  |  |
|  | Si-coupling agent | vinyl trimethoxysilane | KBM-1003 | 5 | 5 | 5 | 5 |
|  |  | vinyl triethoxysilane | KBE-1003 |  |  |  |  |
| cat. MB | carrier rubber | fluororubber | AFLAS 400E | 10 | 10 | 10 | 10 |
|  |  | ETFE resin | LH-8000 (m.p. 180° C.) | 10 | 10 | 10 | 10 |
|  |  | ETFE resin | EP-620 (m.p. 210° C.) |  |  |  |  |
|  | Si—OH cond. cat. | dioctyltin dilaurate | ADKSTAB OT-1 | 0.05 | 0.05 | 0.05 | 0.05 |
|  | antioxidant |  | IRGANOX 1010 | 0.1 | 0.1 | 0.1 | 0.1 |
| Evaluation |  | Suitability for prep. of pellets (Si MB) |  | A | B | D | D |
|  |  | Suitability for prep. of pellets (cat. MB) |  | A | A | A | A |
|  |  | Length formability |  | D | E | E | E |
|  |  | TS |  | D | E | E | E |

|  |  |  |  | Comparative Examples |||
|---|---|---|---|---|---|---|
|  |  |  |  | 9 | 10 | 11 |
| Si MB | base rubber | fluororubber | AFLAS 400E | 50 | 50 | 50 |
|  |  | EVA | VF 120T | 20 | 20 | 20 |
|  |  | ETFE resin | LH-8000 (m.p. 180° C.) | 10 | 10 | 10 |
|  |  | ETFE resin | EP-620 (m.p. 210° C.) |  |  |  |
|  |  | EFEP resin | RP4020 (m.p. 160° C.) |  |  |  |
|  |  | PVDF resin | KAYNER740 (m.p. 170° C.) |  |  |  |
|  |  | FEP resin | NP-101 (m.p. 270° C.) |  |  |  |
|  |  | PFA resin | AP-210 (m.p. 310° C.) |  |  |  |
|  | organic peroxide |  | PERHEXA 25B | 0.2 | 0.2 | 0.001 |
|  | inorganic filler | zinc oxide | Zinc Oxide No. 1 |  | 5 | 5 |
|  |  | calcium carbonate | SOFTON 1200 |  | 400 |  |
|  |  | silica | Aerosil 200 | 0.1 |  |  |
|  |  | silica | CRYSTALITE 5X |  | 50 | 50 |
|  |  | calcined clay | Satitone SP-33 |  |  |  |
|  |  | talc | MV Talc |  |  |  |
|  | Si-coupling agent | vinyl trimethoxysilane | KBM-1003 | 5 | 5 | 5 |
|  |  | vinyl triethoxysilane | KBE-1003 |  |  |  |
| cat. MB | carrier rubber | fluororubber | AFLAS 400E | 10 | 10 | 10 |
|  |  | ETFE resin | LH-8000 (m.p. 180° C.) | 10 | 10 | 10 |
|  |  | ETFE resin | EP-620 (m.p. 210° C.) |  |  |  |
|  | Si—OH cond. cat. | dioctyltin dilaurate | ADKSTAB OT-1 | 0.05 | 0.05 | 0.05 |
|  | antioxidant |  | IRGANOX 1010 | 0.1 | 0.1 | 0.1 |

TABLE 1-continued

| Evaluation | Suitability for prep. of pellets (Si MB) | | | B | D | A |
|---|---|---|---|---|---|---|
| | Suitability for prep. of pellets (cat. MB) | | | A | A | A |
| | Length formability | | | D | E | A |
| | TS | | | D | D | D |

| | | | | Comparative Examples | | |
|---|---|---|---|---|---|---|
| | | | | 12 | 13 | 14 |
| Si MB | base rubber | fluororubber | AFLAS 400E | 50 | 50 | 50 |
| | | EVA | VF 120T | 20 | 20 | 20 |
| | | ETFE resin | LH-8000 (m.p. 180° C.) | 10 | 10 | 10 |
| | | ETFE resin | EP-620 (m.p. 210° C.) | | | |
| | | EFEP resin | RP4020 (m.p. 160° C.) | | | |
| | | PVDF resin | KAYNER740 (m.p. 170° C.) | | | |
| | | FEP resin | NP-101 (m.p. 270° C.) | | | |
| | | PFA resin | AP-210 (m.p. 310° C.) | | | |
| | organic peroxide | | PERHEXA 25B | 0.6 | 0.2 | 0.2 |
| | inorganic filler | zinc oxide | Zinc Oxide No. 1 | 5 | 5 | 5 |
| | | calcium carbonate | SOFTON 1200 | | | |
| | | silica | Aerosil 200 | | | |
| | | silica | CRYSTALITE 5X | 50 | 50 | 50 |
| | | calcined clay | Satitone SP-33 | | | |
| | | talc | MV Talc | | | |
| | Si-coupling agent | vinyl trimethoxysilane | KBM-1003 | 5 | 1 | 16 |
| | | vinyl triethoxysilane | KBE-1003 | | | |
| cat. MB | carrier rubber | fluororubber | AFLAS 400E | 10 | 10 | 10 |
| | | ETFE resin | LH-8000 (m.p. 180° C.) | 10 | 10 | 10 |
| | | ETFE resin | EP-620 (m.p. 210° C.) | | | |
| | Si—OH cond. cat. | dioctyltin dilaurate | ADKSTAB OT-1 | 0.05 | 0.05 | 0.05 |
| | antioxidant | | IRGANOX 1010 | 0.1 | 0.1 | 0.1 |
| Evaluation | Suitability for prep. of pellets (Si MB) | | | D | A | A |
| | Suitability for prep. of pellets (cat. MB) | | | A | A | A |
| | Length formability | | | — | A | E |
| | TS | | | — | D | A |

(Note)
Si MB: silane masterbutch (MB)
cat. MB: catalyst masterbutch
Si-coupling agent: silane coupling agent
Si—OH cond. cat.: silanol condensation catalyst
m.p.: melting point
Suitability for prep. of pellets (Si MB):
Suitability for preparation of pellets (silane MB)
Suitability for prep. of pellets (cat. MB):
Suitability for preparation of pellets (catalyst MB)
TS: tensile strength The following can be seen from the results in Table 1.

Comparative Examples 1 to 14 were each poor in at least one of the pellet preparation suitability (whether the MB could be pelletized as pellets that would suppress foaming and would be difficult to fuse, or not), the length formability (outer appearance property upon a high-speed forming), and the tensile strength.

Comparative Example 1 using a silane MB and a catalyst MB each of which did not contain any ethylene/tetrafluoroethylene copolymer resin, but contained only a fluororubber in a base rubber, was poor in any of the silane MB and catalyst MB pellet preparation suitability, the length formability, and the tensile strength.

Comparative Example 2 using a catalyst MB which contained a fluororubber, but did not contain any ethylene/tetrafluoroethylene copolymer resin in a carrier rubber, was poor in any of the catalyst MB pellet preparation suitability, the length formability, and the tensile strength.

Comparative Example 3 using a silane MB which contained a fluororubber, but did not contain any ethylene/tetrafluoroethylene copolymer resin in the base rubber, was poor in any of the silane MB pellet preparation suitability, the length formability, and the tensile strength.

Comparative Example 4 using a silane MB in which the content of the ethylene/tetrafluoroethylene copolymer resin in a base rubber was too high, was poor in the silane MB pellet preparation suitability and the length formability.

Comparative Example 5 using a silane MB in which an ETEP resin was used in place of the ethylene/tetrafluoroethylene copolymer resin, had insufficient tensile strength. It is considered that this is because compatibility of the silane MB and the catalyst MB was too low.

Comparative Example 6 using a silane MB in which an PVDF resin was used in place of the ethylene/tetrafluoroethylene copolymer resin, was poor in both the length formability and the tensile strength.

Comparative Examples 7 and 8 using a silane MB, in which any of other fluororesins (FEP resin and PFA resin, respectively) was used in place of the ethylene/tetrafluoroethylene copolymer resin, were poor in the silane MB pellet preparation suitability. Further, although electric wires could be produced, Comparative Examples 7 and 8 were poor in the length formability, and forming could not be done unless performed at an extremely low linear speed, and further Comparative Examples 7 and 8 were poor in the outer appearance of the coated layer and moreover also poor in the tensile strength. The fact that the melting point of the above-described other fluororesin was 230° C. or more is also considered to be a factor that caused foaming of the silane MB to become conspicuous.

Comparative Example 9 using a silane MB in which a blending amount of the inorganic filler was too little, was poor in the tensile strength.

Comparative Example 10 using a silane MB in which a blending amount of the inorganic filler was too much, was poor in any of the silane MB pellet preparation suitability, the length formability, and the tensile strength.

Comparative Example 11 using a silane MB in which a blending amount of the organic peroxide was too little, was poor in the tensile strength.

Comparative Example 12 using a silane MB in which a blending amount of the organic peroxide was too much, was poor in the silane MB pellet preparation suitability. Further, no electric wire could be produced. It is considered that this is because too much amount of the organic peroxide caused crosslinking to proceed excessively.

Comparative Example 13 using a silane MB in which a blending amount of the silane coupling gent was too little, was poor in the tensile strength.

Comparative Example 14 using a silane MB in which a blending amount of the silane coupling gent was too much, was poor in the length formability.

In contrast, Examples 1 to 23 each prepared by using a silane MB and a catalyst MB each containing a fluororubber and an ethylene/tetrafluoroethylene copolymer resin, and further using specific amounts of an organic peroxide, an inorganic filler and a silane coupling agent respectively, according to the production method of the present invention, were excellent in the pellet preparation suitability, because the silane MB and the catalyst MB could be prepared as pellets that would suppress foaming and would be difficult to fuse together. Further, because Examples 1 to 23 each had passed the length formability test, while maintaining excellent outer appearance even when forming was performed at a high-speed, and moreover, because Examples 1 to 23 each showed sufficient values in the tensile strength test, electric wires having a coating layer that was excellent in mechanical strength could be produced even by a formed body using a fluororubber.

Further, it is seen that because it was silane-crosslinked, Examples 1 to 23 were also each excellent in heat resistance.

As shown in Table 1, it is seen that in a specific silane crosslinking method using a silane MB and a catalyst MB defined in the present invention, the function and effects of the present invention could be obtained by using a fluororubber in combination with an ethylene/tetrafluoroethylene copolymer resin in specific amounts, respectively, as a resin component, in both the silane MB and the catalyst MB.

For example, in Comparative Examples 6 to 8 using any of said other fluororesins respectively, pellets obtained were blocked even at a line speed of less than 15 m/min. In contrast, in Example 3, a formed body (i.e. an electric wire) being smooth and having good outer appearance in which there was none of gel-aggregated substance and foaming etc. could be produced by extrusion-forming even at such a high speed as a linear speed of 40 m/min or more, and extrusion at 2.5 times faster speed was possible. Further, in contrast to the tensile strength of 5.0 MPa or more and less than 8.5 MPa in Comparative Example 5 using other fluororesin, the tensile strength in Example 3 was 14 MPa or more, whereby the mechanical strength even higher by 5.5 MPa or more could be achieved in the rubber formed body.

Having described our invention as related to the embodiments and the examples, it is our intention that the invention not be limited by any of the details of the description, unless otherwise specified, but rather be construed broadly within its spirit and scope as set out in the accompanying claims.

This application claims priority on Patent Application No. 2018-131049 filed in Japan on Jul. 10, 2018, which is entirely herein incorporated by reference.

The invention claimed is:

1. A method of producing a heat-resistant crosslinked fluororubber formed body, including the following steps (1), (2) and (3):
    Step (1): a step of obtaining a reaction composition by melt-mixing, with respect to 100 parts by mass of a base rubber containing 40to 98% by mass of a fluororubber and 2 to 40% by mass of an ethylene/tetrafluoroethylene copolymer resin, 0.003 to 0.5 parts by mass of an organic peroxide, 0.5 to 400 parts by mass of an inorganic filler, 2 to 15 parts by mass of a silane coupling agent having a grafting reaction site that is capable of being subjected to a grafing reaction with said base rubber in the presence of radicals generated from said organic peroxide, and a silanol condensation catalyst,
    Step (2): a step of obtaining a formed body by forming the reaction composition, and
    Step (3): a step of obtaining the heat-resistant crosslinked fluororubber formed body by bringing the formed body into contact with water,
    wherein, when performing the step (1),
    the step (1) includes the following step (a), step (b) and step (c), and the fluororubber and the ethylene/tetrafluoroethylene copolymer resin are melt-mixed in both of the following steps (a) and (b):
    Step (a): a step of preparing a silane masterbatch containing a silane crosslinkable rubber, by melt-mixing a part of the base rubber, the organic peroxide, the inorganic filler and the silane coupling agent at a temperature equal to or higher than a decomposition temperature of said organic peroxide, and by graft-reacting the grafting reaction site and the base rubber due to radicals generated from said organic peroxide,
    Step (b): a step of preparing a catalyst masterbatch, by melt-mixing a remainder of the base rubber, and the silanol condensation catalyst, and
    Step (c): a step of obtaining the reaction composition, by melt-mixing the silane masterbatch and the catalyst masterbatch.

2. The method of producing a heat-resistant crosslinked fluoron bber formed body according to claim 1, wherein, in the step (1), the base rubber contains 50 to 85% by mass of the fluororubber and 13 to 35% by mass of the ethylene/tetrafluoroethylene copolymer resin, and the blending amount of the inorganic filler is 30 to 280 parts by mass.

3. The method of producing a heat-resistant crosslinked fluororubber formed body according to claim 1, wherein the fluororubber is a tetrafluoroethylene/propylene copolymer rubber.

4. The method of producing a heat-resistant crosslinked fluororubber formed body according to claim 1, wherein a melting point of the ethylene/tetrafluoroethylene copolymer resin is 230° C. or less.

5. The method of producing a heat-resistant crosslinked fluororubber formed body according to claim 1, wherein the base rubber contains an ethylene/vinyl acetate copolymer resin, an ethylene/(meth)acrylic acid ester copolymer resin, an ethylene/(meth)acrylic acid copolymer resin or an acrylic rubber, or a combination thereof.

6. The method of producing a heat-resistant crosslinked fluororubber formed body according to claim 1, wherein the silage coupling agent is vinyl trimethoxysilane or vinyl triethoxysilane.

7. The method of producing a heat-resistant crosslinked fluororubber formed body according to claim 1, wherein the inorganic filler includes silica, calcium carbonate, zinc oxide, or a calcined clay, or a combination thereof.

8. The method of producing a heat-resistant crosslinked fluororubber formed body according to claim 1, wherein the melt-mixing in the step (a) is performed using a closed mixer.

9. A heat-resistant crosslinked fluororubber formed body produced by the method of producing a heat-resistant crosslinked fluororubber formed body according to claim 1.

10. The heat-resistant crosslinked fluororubber formed body according to claim 9, wherein the base rubber is crosslinked with the inorganic filler through a silanol bond.

11. A heat-resistant product comprising the heat-resistant crosslinked fluororubber formed body according to claim 9.

12. The heat-resistant product according to claim 11, wherein the heat-resistant crosslinked fluororubber formed body is a coated layer of an electric wire or an optical fiber cable.

\* \* \* \* \*